United States Patent
Chen et al.

(10) Patent No.: US 9,762,903 B2
(45) Date of Patent: Sep. 12, 2017

(54) EXTERNAL PICTURES IN VIDEO CODING

(71) Applicant: QUALCOMM Incorporated, San Diego, CA (US)

(72) Inventors: Ying Chen, San Diego, CA (US); Ye-Kui Wang, San Diego, CA (US); Jianle Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 13/906,264

(22) Filed: May 30, 2013

(65) Prior Publication Data

US 2013/0322531 A1     Dec. 5, 2013

Related U.S. Application Data

(60) Provisional application No. 61/654,552, filed on Jun. 1, 2012.

(51) Int. Cl.
    *H04N 19/50*      (2014.01)
    *H04N 19/70*      (2014.01)
    (Continued)

(52) U.S. Cl.
    CPC ....... *H04N 19/00569* (2013.01); *H04N 19/30* (2014.11); *H04N 19/70* (2014.11); *H04N 19/597* (2014.11)

(58) Field of Classification Search
    CPC .. H04N 19/00569; H04N 19/30; H04N 19/70; H04N 19/597; H04N 19/147;
    (Continued)

(56) References Cited

U.S. PATENT DOCUMENTS

| | | | | |
|---|---|---|---|---|
| 817,866 | A * | 4/1906 | McAfee | B27C 5/006 144/147 |
| 6,937,774 | B1 * | 8/2005 | Specht | G06T 3/4061 348/362 |

(Continued)

FOREIGN PATENT DOCUMENTS

| | | |
|---|---|---|
| CN | 101127904 A | 2/2008 |
| CN | 102484700 A | 5/2012 |

(Continued)

OTHER PUBLICATIONS

"Overview of the Scalable Video Coding Extension of the H.264/AVC Standard", by Heiko Schwarz et al., (c)IEEE 2007 vol. 17 No. 9 Sep. 2007.*

(Continued)

*Primary Examiner* — Dramos I Kalapodas
(74) *Attorney, Agent, or Firm* — Shumaker & Sieffert, P.A.

(57) ABSTRACT

A video encoder generates a syntax element that indicates whether a video unit of a current picture is predicted from an external picture. The external picture is in a different layer than the current picture. Furthermore, the video encoder outputs a video data bitstream that includes a representation of the syntax element. The video data bitstream may or may not include a coded representation of the external picture. A video decoder obtains the syntax element from the video data bitstream. The video decoder uses the syntax element in a process to reconstruct video data of a portion of the video unit.

27 Claims, 7 Drawing Sheets

(51) Int. Cl.
*H04N 19/30* (2014.01)
*H04N 19/597* (2014.01)

(58) Field of Classification Search
CPC .. H04N 19/105; H04N 19/463; H04N 19/176; H04N 19/139; H04N 13/0048; H04N 19/61; H04N 19/46; H04N 19/44; H04N 19/172; H04N 19/174; H04N 11/04; H04N 19/186; H04N 19/50; H04N 19/187; H04N 19/00321; H04N 19/573; H04N 19/34; H04N 21/438; H04N 19/29; H04N 19/40; H04N 21/4305; H04N 21/234327; H04N 21/64792; G06K 9/36
See application file for complete search history.

(56) References Cited

U.S. PATENT DOCUMENTS

| | | | | |
|---|---|---|---|---|
| 7,206,347 | B2* | 4/2007 | Lim | H04N 21/23406 375/240.25 |
| 7,489,342 | B2* | 2/2009 | Xin | H04N 19/597 348/218.1 |
| 7,782,947 | B2 | 8/2010 | Jeon et al. | |
| 8,509,558 | B2* | 8/2013 | Ma | G06T 7/0065 348/239 |
| 8,670,626 | B2* | 3/2014 | Choi | H04N 19/00533 382/232 |
| 8,938,004 | B2 | 1/2015 | Boyce et al. | |
| 2004/0117840 | A1* | 6/2004 | Boudreau | G09B 5/065 725/98 |
| 2006/0233242 | A1* | 10/2006 | Wang | H04N 19/70 375/240.08 |
| 2006/0256851 | A1* | 11/2006 | Wang | H04N 21/234327 375/240.01 |
| 2007/0263087 | A1* | 11/2007 | Hong | H04N 7/152 348/14.13 |
| 2008/0043832 | A1* | 2/2008 | Barkley | H04N 21/234327 375/240 |
| 2008/0089411 | A1* | 4/2008 | Wenger | H04N 19/105 375/240.12 |
| 2008/0095228 | A1* | 4/2008 | Hannuksela | H04N 19/70 375/240.01 |
| 2009/0003445 | A1* | 1/2009 | Ying | H04N 19/105 375/240.15 |
| 2009/0034629 | A1* | 2/2009 | Suh | H04H 20/30 375/240.27 |
| 2009/0262804 | A1* | 10/2009 | Pandit | H04N 19/597 375/240.12 |
| 2009/0279612 | A1* | 11/2009 | Pandit | H04N 19/597 375/240.25 |
| 2010/0020871 | A1* | 1/2010 | Hannuksela | H04N 21/438 375/240.12 |
| 2010/0027615 | A1* | 2/2010 | Pandit | H04N 19/597 375/240.01 |
| 2010/0165077 | A1* | 7/2010 | Yin | H04N 19/597 348/42 |
| 2010/0189182 | A1* | 7/2010 | Hannuksela | H04N 21/234327 375/240.25 |
| 2011/0090960 | A1* | 4/2011 | Leontaris | H04N 19/103 375/240.12 |
| 2011/0116546 | A1* | 5/2011 | Guo | H04N 19/176 375/240.16 |
| 2012/0027089 | A1 | 2/2012 | Chien et al. | |
| 2012/0050475 | A1 | 3/2012 | Tian et al. | |
| 2012/0148169 | A1* | 6/2012 | Choi | H04N 19/597 382/233 |
| 2012/0212579 | A1* | 8/2012 | Frojdh | H04N 19/597 348/43 |
| 2012/0229602 | A1 | 9/2012 | Chen et al. | |
| 2012/0230431 | A1* | 9/2012 | Boyce | H04N 19/30 375/240.25 |
| 2012/0250765 | A1 | 10/2012 | Wu et al. | |
| 2012/0257674 | A1* | 10/2012 | Macq | H04N 19/597 375/240.12 |
| 2012/0281928 | A1* | 11/2012 | Cohen | G06T 9/40 382/240 |
| 2013/0114742 | A1* | 5/2013 | Hannuksela | H04N 19/00533 375/240.25 |
| 2013/0163663 | A1* | 6/2013 | Yu | H04N 19/105 375/240.12 |
| 2013/0170552 | A1* | 7/2013 | Kim | H04N 19/597 375/240.16 |
| 2015/0131712 | A1 | 5/2015 | Haskell et al. | |

FOREIGN PATENT DOCUMENTS

| | | |
|---|---|---|
| CN | 103430458 A | 12/2013 |
| WO | 2008108566 A1 | 9/2008 |
| WO | 2010126613 A2 | 11/2010 |
| WO | 2013032512 A1 | 3/2013 |

OTHER PUBLICATIONS

"Overview of the Scalable Video Coding Extension of the H.264/AVC Standard" Heiko Schwarz et al., (c) IEEE 2007.*
Anonymous: "Text of ISO/IEC 14496-15 2nd edition", 91 MPEG Meeting; Jan. 18, 2010-Jan. 22, 2010; Kyoto; (Motion Picture Expertgroup or ISO/IEC JTC1/SC29/WG11), No. N11139, Jan. 22, 2010 (Jan. 22, 2010), XP030017636, ISSN: 0000-0030 the whole document.
Boyce et al., "High-level syntax modifications for SHVC," JCT-VC Meeting; MPEG Meeting; Incheon; (Joint Collaborative Team on Video Coding of ISO/IEC JTC1/SC29/WG11 and ITU-T SG.16); URL: http://wftp3.itu.int/av-arch/jctvc-site/,, Document No. JCTVC-M0046, Apr. 18-26, 2013, 12 pp.
Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May, 7 2012, JCTVC-I1003_d2, 290 pp.
Bross et al., "High efficiency video coding (HEVC) text specification draft 8," 10th Meeting: Stockholm, SE, Jul. 11-20, 2012, JCTVC-J1003_d7, 261 pp.
Bross et al., "High efficiency video coding (HEVC) text specification draft 9," 11th Meeting: Shanghai, CN, Oct. 10-19, 2012, JCTVC-K1003_v7, 290 pp.
Bross et al., "WD4: Working Draft 4 of High-Efficiency Video Coding," 6th Meeting: JCTVC-F803_d2, Torino, IT, Jul. 14-22, 2011, 226 pp.
Bross et al., "WD5: Working Draft 5 of High-Efficiency Video Coding," 7th Meeting: Geneva, Switzerland, Nov. 21-30, 2011, JCTVC-G1103_d2, 214 pp.
Choi et al., "Scalable video coding based on high efficiency video coding (HEVC)," Communications, Computers and Signal Processing (PACRIM), 2011 IEEE Pacific Rim Conference on, IEEE, Aug. 23, 2011, 6 pp.
Hannuksela et al., "MV-HEVC/SHVC HLS: On inter-layer sample and syntax prediction indications," MPEG Meeting; Incheon; (Motion Picture Expert Group or ISO/IEC JTC1/SC29/WG11), No. m28665, Apr. 18-26, 2013, 7 pp.
International Search Report and Written Opinion—PCT/US2013/043706—ISAEPO—Jan. 8, 2014, 16 pp.
ITU-T H.264, Series H: Audiovisual and Multimedia Systems, Infrastructure of audiovisual services—Coding of moving video, Advanced video coding for generic audiovisual services, Mar. 2005, 343 pp.
ITU-T H.264, Series H: Audiovisual and Multimedia Systems, Infrastructure of audiovisual services—Coding of moving video, Advanced video coding for generic audiovisual services, Mar. 2010, 674 pp.

(56) References Cited

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Schwarz et al., "Overview of the Scalable Video Coding Extension of the H.264/AVC Standard," IEEE Transactions on Circuits and Systems for Video Technology, vol. 17, No. 9, Sep. 2007, 18 pp.

Sjoberg et al., "High-Level Syntax for Bitstream Extraction," JCT-VC Meeting; MPEG Meeting; Geneva;(Joint Collaborative Team on Video Coding of ISO/IEC JTC1/SC29/WG11 and ITU-T SG.16); URL: http://wftp3.itu.int/av-arch/jctvc-site/, Document No. JCTVC-G607, WG11 No. m22172, Nov. 21-30, 2011, 14 pp.

Wang et al., "AHG9: Signalling and derivation of inter-layer RPS for HEVC 3DV and scalable extensions," MPEG Meeting; Incheon; (Motion Picture Expert Group or ISO/IEC JTC1/SC29/WG11), Document No. JCTVC-M0269, WG11 No. m28726, Apr. 18-26, 2013, 5 pp.

Wang et al., "MV-HEVC/SHVC HLS: On signalling and derivation of inter-layer RPS (combining aspects of JCTVC-M0046 and JCTVC-M0269)", MPEG Meeting; Incheon; (Motion Picture Expert Group or ISO/IEC JTC1/SC29/WG11), Document No. JCTVC-M0458, WG11 No. m29503, Apr. 18-26, 2013, 5 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

Yea et al., "View synthesis prediction for multiview video coding," Signal Processing: Image Communication, Elsevier B.V., vol. 24, Oct. 19, 2008, 12 pp.

Second Written Opinion of international application No. PCT/US2013/043706, mailed Jul. 9, 2014, 7 pp.

International Preliminary Report on Patentability from International Application No. PCT/US2013/043706, dated Jan. 10, 2014, 11 pp.

Boyce et al., "Extensible High Layer Syntax for Scalability," MPEG Meeting; Mar. 16-23, 2011; Geneva, CH; (Motion Picture Expert Group or ISO/IEC JTC1/SC29/WG11), JCTVC-E279, No. m19806, Mar. 22, 2011, 10 pp.

\* cited by examiner

EXTERNAL PICTURES IN VIDEO CODING

This application claims the benefit of U.S. Provisional Patent Application No. 61/654,552, filed Jun. 1, 2012, the entire content of which is incorporated herein by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, 3D video bitstreams may contain not only texture view components, but also depth view components. For example, each view may comprise one texture view component and one depth view component.

SUMMARY

In general, this disclosure describes syntax elements that support the use of external pictures in video coding. Particularly, a video encoder may generate a syntax element that indicates whether a video unit of a current picture is predicted from an external picture. The external picture is in a different layer than the current picture. The video data bitstream may or may not include a coded representation of the external picture. Furthermore, the video encoder may output a video data bitstream that includes a representation of the syntax element. A video decoder may decode the syntax element from the video data bitstream. In addition, the video decoder may use the syntax element in a process to reconstruct video data of a portion of the video unit.

In one example, this disclosure describes a method of decoding video data. The method comprises obtaining, from a video data bitstream, a syntax element that indicates whether a video unit of a current picture is predicted from an external picture that is in a different layer than the current picture. The method also comprises using the syntax element in a process to reconstruct video data of a portion of the video unit.

In another example, this disclosure describes a method of encoding video data. The method comprises generating a syntax element that indicates whether a video unit of a current picture is predicted from an external picture that is in a different layer than the current picture. The method also comprises outputting a video data bitstream, the video data bitstream including a representation of the syntax element.

In another example, this disclosure describes a video decoding device comprising one or more processors configured to obtain, from a video data bitstream, a syntax element that indicates whether a video unit of a current picture is predicted from an external picture that is in a different layer than the current picture. The one or more processors are also configured to use the syntax element in a process to reconstruct video data of a portion of the video unit.

In another example, this disclosure describes a video encoding device comprising one or more processors configured to generate a syntax element that indicates whether a video unit of a current picture is predicted from an external picture that is in a different layer than the current picture. The one or more processors are also configured to output the coded video bitstream, the coded video bitstream including a representation of the syntax element.

In another example, this disclosure describes a video decoding device comprising means for obtaining, from a video data bitstream, a syntax element that indicates whether a video unit of a current picture is predicted from an external picture that is in a different layer than the current picture. The video decoding device also comprises means for using the syntax element in a process to reconstruct video data of a portion of the video unit.

In another example, this disclosure describes a video encoding device comprising means for generating a syntax element that indicates whether a video unit of a current picture is predicted from an external picture that is in a different layer than the current picture. The video encoding device also comprises means for outputting the video data bitstream, the video data bitstream including a representation of the syntax element.

In another example, this disclosure describes a computer-readable data storage medium having instructions stored thereon that, when executed, configure a video decoding device to obtain, from a video data bitstream, a syntax element that indicates whether a video unit of a current picture is predicted from an external picture that is in a different layer than the current picture. The instructions, when executed, further configure the video decoding device to use the syntax element in a process to reconstruct video data of a portion of the video unit.

In another example, this disclosure describes a computer-readable data storage medium having instructions stored thereon that, when executed, configure a video encoding device to generate a syntax element that indicates whether a video unit of a current picture is predicted from an external picture that is in a different layer than the current picture. The instructions, when executed, further configure the video encoding device to output the video data bitstream, the video data bitstream including a representation of the syntax element.

The details of one or more examples of the disclosure are set forth in the accompanying drawings and the description below. Other features, objects, and advantages will be apparent from the description, drawings, and claims.

DETAILED DESCRIPTION

Figure 1:
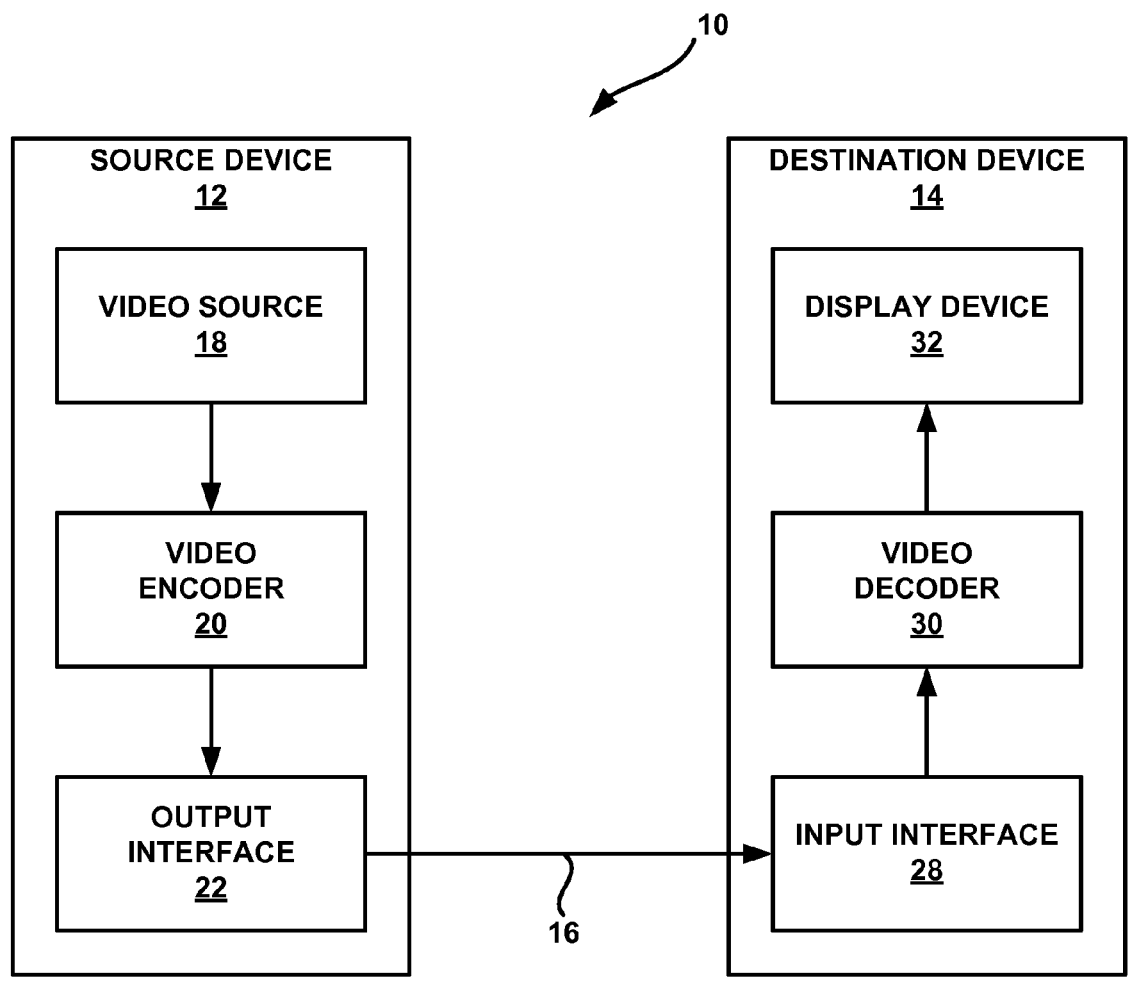
FIG. 1 is a block diagram illustrating an example video coding system that may utilize the techniques described in this disclosure.

In 3-dimensional (3D) video coding and scalable video coding, the use of externally-generated pictures (i.e., external pictures) may increase coding efficiency of some video units, such as coding units (CUs), prediction units (PUs), macroblocks, macroblock partitions, and so on. A video unit may include a block of samples (e.g., video data) and associated syntax elements. Video encoders do not generate network abstraction layer (NAL) units that encapsulate coded slices of externally-generated pictures. Moreover, video decoders do not decode NAL units that encapsulate coded slices of externally-generated pictures. Rather, video encoders and video decoders may synthesize externally-generated pictures or externally-generated pictures may be signaled out-of-band. When a video encoder encodes a video unit using an externally-generated picture, the video encoder does not signal any motion information for the video unit. Rather, when a CU is encoded using an externally-generated picture, a predictive block for the video unit may match a co-located block of the externally-generated picture.

The base specifications of some video coding standards (e.g., High-Efficiency Video Coding (HEVC), H.264/Advanced Video Coding (AVC), etc.) do not support the use of such externally-generated pictures. In accordance with the techniques of this disclosure, a video encoder may output a bitstream (i.e., a video data bitstream) that includes data representing (i.e., a representation of) a syntax element that indicates whether a video unit is predicted from at least one externally-generated picture. For ease of explanation, this disclosure may refer to a syntax element that indicates whether a video unit is predicted from an externally-generated picture as an "external picture flag." In this disclosure, a video unit (such as a CU or a PU) may be predicted from an externally-generated picture when a predictive block associated with the video unit is generated based, at least in part, on the externally-generated picture. If the bitstream does not include layers other than a base layer, the external picture flag for a video unit may never indicate that the video unit is predicted from an externally-generated picture (e.g., the external picture flag may always be equal to 0).

Thus, in accordance with one or more example techniques of this disclosure, a video encoder may generate a syntax element that indicates whether a video unit of a current picture is predicted from an external picture that is in a different layer than the current picture. The video data bitstream may or may not include a coded representation of the external picture. The video encoder may output the video data bitstream. The video data bitstream may include a representation of the syntax element. In this disclosure, a representation of a syntax element may refer to data representing the syntax element. Similarly, a video decoder may decode, from a video data bitstream, a syntax element that indicates whether a video unit of a current picture is predicted from an external picture that is in a different layer than the current picture. Moreover, the video decoder may use the syntax element in a process to reconstruct video data (e.g., a sample block) of at least a portion of the video unit.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in the example of FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to MVC-based 3DV always contains a sub-bitstream that is compliant to a MVC profile, e.g., stereo high profile. Furthermore, there is an ongoing effort to generate three-dimensional video (3DV) coding extensions to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, ISO/IEC MPEG-4 Visual, and ITU-T H.264, ISO/IEC Visual.

In the example of FIG. 1, video encoder 20 and video decoder 30 may operate according to the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A draft of the upcoming HEVC standard, referred to as "HEVC Working Draft 6" is described in Bross et al., "High Efficiency Video Coding (HEVC) text specification draft 6," Joint Collaborative Team on Video Coding (JCT-VC) of ITU-T SG16 WP3 and ISO/IEC JTC1/SC29/WG11, $7^{th}$ Meeting, Geneva, Switzerland, November 2011, which as of May 30, 2013, is available from http://phenix.it-sudparis.eu/jct/doc_end_user/documents/8 San %20Jose/wg11/JCTVC-H1003-v1.zip. Another draft of the upcoming HEVC standard, referred to as "HEVC Working Draft 10" is described in Bross et al., "High Efficiency Video Coding (HEVC) text specification draft 10 (for FDIS & Last Call)," Joint Collaborative Team on Video Coding (JCT-VC) of ITU-T SG16 WP3 and ISO/IEC JTC1/SC29/WG11, $12^{th}$ Meeting, Geneva, Switzerland, January 2013, which as of May 30, 2013, is available from http://phenix.it-sudparis.eu/jct/doc_end_user/documents/12_Geneva/wg11/JCTVC-L1003-v34.zip. Furthermore, there are ongoing efforts to produce SVC, multi-view coding, and 3DV extensions for HEVC. The SVC extension of HEVC may be referred to as SHEVC. The 3DV extension of HEVC may be referred to as HEVC-based 3DV or 3D-HEVC.

In HEVC and other video coding standards, a video sequence typically includes a series of pictures. Pictures may also be referred to as "frames." A picture may include three sample arrays, denoted $S_L$, $S_{Cb}$ and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may be a coding tree block of luma samples, two corresponding coding tree blocks of chroma samples, and syntax structures used to code the samples of the coding tree blocks. In a monochrome picture or a picture coded using three separate color planes, a CTU may be a coding tree block of samples and syntax structures used to code the samples. A coding tree block may be an N×N block of samples. A CTU may also be referred to as a "tree block" or a "largest coding unit" (LCU). The CTUs of HEVC may be broadly analogous to the macroblocks of other video coding standards, such as H.264/AVC. However, a CTU is not necessarily limited to a particular size and may include one or more coding units (CUs). A slice may include an integer number of CTUs ordered consecutively in the raster scan. Each CTU may be associated with a coding_tree syntax structure that includes syntax elements associated with the CTU. A syntax structure may be zero or more syntax elements present together in a bitstream in a specified order.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may be a coding block of luma samples and two corresponding coding blocks of chroma samples of a picture that has a luma sample array, a Cb sample array and a Cr sample array, and syntax structures used to code the samples of the coding blocks. In a monochrome picture or a picture coded using three separate color planes, a CU may be a coding block of samples and syntax structures used to code the samples. More specifically, video encoder 20 may generate a coding tree for a CTU. Internal nodes of the coding tree may correspond to coding_tree syntax structures and leaf nodes of the coding tree may correspond to CUs. A coding tree may be represented as a coding_tree syntax structure that encapsulates additional coding_tree syntax structures or CUs.

Video encoder 20 may partition a coding block of a CU into one or more prediction blocks. A prediction block may be a rectangular (i.e., square or non-square) block of samples on which the same prediction is applied. A prediction unit (PU) of a CU may be a prediction block of luma samples, two corresponding prediction blocks of chroma samples of a picture, and syntax structures used to predict the prediction block samples. In a monochrome picture or a picture that is coded using three separate color planes, a PU may be a prediction block of samples and syntax structures used to predict the prediction block samples. Video encoder 20 may generate predictive luma, Cb and Cr blocks for luma, Cb and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU.

If video encoder 20 uses inter prediction to generate the predictive blocks of a PU, video encoder 20 may generate the predictive blocks of the PU based on decoded samples of one or more pictures other than the picture associated with the PU. Inter prediction may be uni-directional inter prediction (i.e., uni-prediction) or bi-directional inter prediction (i.e., bi-prediction). To perform uni-prediction or bi-prediction, video encoder 20 may generate a first reference picture list (RefPicList0) and a second reference picture list (RefPicList1) for a current slice. Each of the reference picture lists may include one or more reference pictures. When using uni-prediction, video encoder 20 may search the reference pictures in either or both RefPicList0 and RefPicList1 to determine a reference location within a reference picture. Furthermore, when using uni-prediction, video encoder 20 may generate, based at least in part on samples corresponding to the reference location, the predictive blocks for the PU. Moreover, when using uni-prediction, video encoder 20 may generate a single motion vector that indicates a spatial displacement between a sample block of the PU and the reference location. To indicate the spatial displacement between a sample block of the PU and the reference location, a motion vector may include a horizontal component specifying a horizontal displacement between the sample block of the PU and the reference location and may include a vertical component specifying a vertical displacement between the sample block of the PU and the reference location.

When using bi-prediction to encode a PU, video encoder 20 may determine a first reference location in a reference picture in RefPicList0 and a second reference location in a reference picture in RefPicList1. Video encoder 20 may then generate, based at least in part on samples corresponding to the first and second reference locations, the predictive blocks for the PU. Moreover, when using bi-prediction to encode the PU, video encoder 20 may generate a first motion vector indicating a spatial displacement between a sample block of the PU and the first reference location and a second motion vector indicating a spatial displacement between the sample block of the PU and the second reference location.

After video encoder 20 generates predictive luma, Cb and Cr blocks for one or more PUs of a CU, video encoder 20 may generate a luma residual block for the CU. Each sample in the CU's luma residual block may indicate a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb and Cr residual blocks of a CU into one or more luma, Cb and Cr transform blocks. A transform block may be a rectangular block of samples on which the same transform is applied. A transform unit (TU) of a CU may be a transform block of luma samples, two corresponding transform blocks of chroma samples, and syntax structures used to transform the transform block samples. Thus, each TU of a CU may be associated with a luma transform block, a Cb transform block, and a Cr transform block. In a monochrome picture or a picture that is coded using three separate color planes, a TU may be a transform block of luma samples of size 8×8, 16×16, or 32×32 or four transform blocks of luma samples of size 4×4 and syntax structures used to transform the transform block samples. The luma transform block associated with the TU may be a sub-block of the CU's luma residual block. The Cb transform block may be a sub-block of the CU's Cb residual block. The Cr transform block may be a sub-block of the CU's Cr residual block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. Furthermore, video encoder 20 may inverse quantize transform coefficients and apply an inverse transform to the transform coefficients in order to reconstruct transform blocks of TUs of CUs of a picture. The video encoder 20 may use the reconstructed transform blocks of TUs of a CU and the predictive blocks of PUs of the CU to reconstruct coding blocks of the CU. By reconstructing the coding blocks of each CU of a picture, video encoder 20 may reconstruct the picture. Video encoder 20 may store reconstructed pictures in a decoded picture buffer (DPB). Video encoder 20 may use reconstructed pictures in the DPB for inter prediction and intra prediction.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Video encoder 20 may output the entropy-encoded syntax elements in a bitstream. In this way, video encoder 20 may output a bitstream that includes representations of the syntax elements.

Video decoder 30 may receive a bitstream. In addition, video decoder 30 may parse the bitstream to obtain values of syntax elements. In this disclosure, obtaining a syntax element from a bitstream or a syntax structure within a bitstream may refer to determining, based on a bitstream or the syntax structure, a value of the syntax element. Obtaining a syntax element may involve entropy decoding data in the bitstream that represent the syntax element. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. Video decoder 30 may use the motion vector or motion vectors of PUs to generate predictive blocks for the PUs.

In addition, video decoder 30 may inverse quantize transform coefficient blocks associated with TUs of the current CU. Video decoder 30 may perform inverse transforms on the transform coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. In other words, video decoder 30 may reconstruct video data of at least a portion of a video unit (e.g., the current CU). By reconstructing the coding blocks for each CU of a picture, video decoder 30 may reconstruct the picture. Video decoder 30 may store decoded pictures in a decoded picture buffer for output and/or for use in decoding other pictures.

Video encoder 20 may output a bitstream that includes representations of syntax elements. The bitstream may include a sequence of bits that forms a representation of coded pictures and associated data. The bitstream may comprise a sequence of network abstraction layer (NAL) units. Each of the NAL units includes a NAL unit header and encapsulates a raw byte sequence payload (RBSP). The NAL unit header may include a syntax element (e.g., nal_unit_type) that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for Supplemental Enhancement Information (SEI), and so on. NAL units that encapsulate RBSPs for video coding data (as opposed to RBSPs for parameter sets and SEI messages) may be referred to as video coding layer (VCL) NAL units. A NAL unit that encapsulates a coded slice may be referred to herein as a coded slice NAL unit. An RBSP for a coded slice may include a slice header and slice data.

The headers of NAL units may include layer identifier syntax elements (e.g., nuh_reserved_zero_6 bits syntax elements). The layer identifier syntax element of a NAL unit is equal to 0 if the NAL unit relates to a base layer in multi-view coding, 3DV coding, or scalable video coding. Data in a base layer of a bitstream may be decoded without reference to data in any other layer of the bitstream. If the NAL unit does not relate to a base layer in multi-view coding, 3DV, or scalable video coding, the layer identifier syntax element may have a non-zero value. Specifically, if a NAL unit does not relate to a base layer in multi-view coding, 3DV, or scalable video coding, the layer identifier syntax element of the NAL unit specifies a layer identifier.

Furthermore, some pictures within a layer may be decoded without reference to particular other pictures within the same layer. Thus, NAL units encapsulating data of particular pictures of a layer may be removed from the bitstream without affecting the ability of video decoder 30 to decode other pictures in the layer. For example, pictures with even picture order count (POC) values may be decodable without reference to pictures with odd POC values. Removing NAL units encapsulating data of such pictures may reduce the frame rate of the bitstream. A subset of pictures within a layer that may be decoded without reference to other pictures within the layer may be referred to herein as a sub-layer. POC values are variables associated with each picture. The POC value associated with a picture uniquely identifies the associated picture among all pictures in a coded video sequence, and, when the associated picture is to be output from a decoded picture buffer, indicates the position of the associated picture in output order relative to the output order positions of the other pictures in the same coded video sequence that are to be output from the decoded picture buffer.

NAL units may include temporal identifier syntax elements (e.g., nuh_temporal_id_plus1 syntax elements). The temporal identifier syntax element of a NAL unit may indicate a temporal identifier (i.e., a temporal_id) of the NAL unit. If the temporal identifier of a first NAL unit is less than the temporal identifier of a second NAL unit, the data encapsulated by the first NAL unit may be decoded without reference to the data encapsulated by the second NAL unit.

Operation points of a bitstream are each associated with a set of layer identifiers (i.e., a set of nuh_reserved_zero_6bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. An operation point representation is a bitstream subset (i.e., a sub-bitstream) that is associated with an operation point. The operation point representation of an operation point may include each NAL unit that is associated with the operation point. The operation point representation does not include VCL NAL units that are not associated with the operation point.

An external source may specify a set of target layer identifiers for an operation point. For example, an intermediate network device, such as a media-aware network element (MANE), may specify the set of target layer identifiers. In this example, the intermediate device may use the set of target layer identifiers to identify an operation point. The intermediate device may then extract the operation point representation for the operation point and forward the operation point representation, instead of the original bitstream, to a client device. Extracting and forwarding the operation point representation to the client device may reduce the bit rate of the bitstream.

When video encoder 20 begins encoding a current picture of the video data, video encoder 20 may generate five sets of reference pictures (i.e., reference picture sets) for the current picture. These five reference picture sets are: RefPicSetStCurrBefore, RefPicSetStCurrAfter, RefPicSetStFoll, RefPicSetLtCurr, and RefPicSetLtFoll. The reference pictures in RefPicSetStCurrBefore, RefPicSetStCurrAfter, RefPicSetStFoll are referred to as "short-term reference pictures" or "STRPs." The reference pictures in RefPicSetLtCurr and RefPicSetLtFoll are referred to as "long-term reference pictures" or "LTRPs." In some instances, LTRPs may remain available for use in inter prediction for longer periods of time than STRPs. Video encoder 20 may regenerate the five reference picture sets for each picture of the video data.

Furthermore, when a current slice of the current picture is a P slice, a video encoder may use the reference pictures from the RefPicStCurrAfter, RefPicStCurrBefore, and RefPicStLtCurr reference picture sets of the current picture to generate a single reference picture list (RefPicList0) for the current slice. When the current slice is a B slice, video encoder 20 may use the reference pictures from the RefPicStCurrAfter, RefPicStCurrBefore, and RefPicStLtCurr reference picture sets of the current picture to generate two reference picture lists (RefPicList0 and RefPicList1) for the current slice. In other words, reference picture list initialization creates a default List 0 and List 1 (if the current slice is a B slice) based on three reference picture set (RPS) subsets: RefPicStCurrBefore, RefPicSetStCurrAfter, and RefPicSetLtCurr. RefPicStCurrBefore may include STRPs that are used by the current picture and that occur earlier than the current picture in output order. RefPicStCurrAfter may include STRPs that are used by the current picture and that occur later than the current picture in output order. RefPicLtCurr may include LTRPs that are used by the current picture.

When video encoder 20 uses inter prediction to generate predictive blocks of a PU of the current picture, video encoder 20 may generate the predictive blocks of the PU based on samples within one or more reference pictures in one or more of the reference picture lists for the current slice. For B slices, a video coder may use List 0 and List 1 (i.e., RefPicList1) for bi-prediction (i.e., inter prediction with two reference pictures). In H.264/AVC, List 0 and List 1 may also be used for uni-prediction (i.e., inter prediction with one reference picture). Having a separate list for uni-prediction may make it possible to remove the signaling overhead that can arise when List 0 and List 1 are used for uni-prediction (e.g., if the same reference picture appears in both List 0 and List 1).

To construct list 0, a video coder may insert reference pictures from RefPicStCurrBefore into list 0 in ascending order of POC distance to the current picture, then insert reference pictures from RefPicStCurrAfter into list 0 in ascending order of POC distance to the current picture, and then insert reference pictures from RefPicStLtCurr into list 0. To construct list 1, the video coder may insert reference pictures from RefPicStCurrAfter into list 1 in ascending order of POC distance to the current picture, then insert reference pictures from RefPicStCurrBefore into list 1 in ascending order of POC distance to the current picture, and then insert reference pictures from RefPicStLtCurr into list 1. In other words, STRPs with earlier (later) output order are firstly inserted into list 0 (list 1) in ascending order of POC distance to the current picture, then STRPs with later (earlier) output order are inserted into list 0 (list 1) in ascending order of POC distance to the current picture, and finally the LTRPs are inserted at the end. In terms of RPS, for List 0, the entries in RefPicSetStCurrBefore are inserted in the initial list, followed by the entries in RefPicSetStCurrAfter. Afterwards, the entries in RefPicSetLtCurr, if available, are appended. The POC distance of a reference picture to the current picture may be a difference between the POC value of the reference picture and the POC value of the current picture.

In HEVC, a video coder may repeat the above process when the number of entries in a reference picture list (e.g., List 0 or List 1) is smaller than a target number of active reference pictures. In other words, reference pictures that have already been added to the reference picture list may be added to the reference picture list again. The target number of active reference pictures may be indicated in a PPS, a slice header, or another syntax structure represented in the bitstream. A PPS is a syntax structure that may contain syntax elements that apply to zero or more entire coded pictures. When the number of reference pictures (i.e., entries) in a reference picture list (e.g., List 0 or List 1) is larger than the target number of active reference pictures, the video coder may truncate the reference picture list. By truncating the reference picture list, the video coder may ensure that the number of reference pictures in the reference picture list does not exceed the target number of active reference pictures.

After a video coder has initialized a reference picture list (e.g., List 0 or List 1), the video coder may modify the order of the reference pictures in the reference picture list. In other words, the video coder may perform a reference picture list modification (RPLM) process. Video encoder 20 may include RPLM commands in the bitstream. In other words, the bitstream may include representations of the RPLM commands. The RPLM commands may indicate to video decoder 30 how to modify the order of reference pictures in a reference picture list. Thus, video decoder 30 may modify, based on RPLM commands, the order of reference pictures in a reference picture list. The video coder may modify the order of the reference pictures in any order, including the case where one particular reference picture may appear in more than one position in the reference picture list.

In HEVC, when a syntax element (e.g., a flag) that indicates whether RPLM commands are present is set to 1, a fixed number of RPLM commands are included in the bitstream, and each RPLM command inserts one entry for a reference picture list. In some examples, the fixed number of RPLM commands is equal to the target number of reference pictures in the reference picture list. A RPLM command may identify a reference picture by an index to the reference picture list for the current picture derived from the RPS. This is different from the RPLM process in H.264/AVC. In the RPLM process for H.264/AVC, a picture is identified either by the picture number (derived from the frame_num syntax element) or the long-term reference picture index. Furthermore, in the RPLM process for H.264/AVC, it is possible that fewer RPLM commands are needed than in HEVC. For example, in H.264/AVC, an RPLM command may indicate swapping the first two entries of an initial list or inserting one entry at the beginning of the initial list and shifting the others.

Furthermore, in some proposals for HEVC, a video coder may generate a combined reference picture list (i.e., List C). Unlike List 0 and List 1, which are constructed from an RPS, the video coder may construct List C from the final List 0 and List 1. That is, the video coder may construct List C from List 0 and List 1 after applying RPLM processes to List 0 and List 1. If a modification syntax element (e.g., a modification flag) for the combined list is 0, video decoder 30 may construct the combined list by an implicit mechanism. Otherwise, if the modification syntax element for the combined list is 1, video decoder 30 may construct the combined list based at least in part on explicitly signaled reference picture combination commands.

In some cases, video encoder 20 may indicate the motion information of a PU using merge mode or advanced motion vector prediction (AMVP) mode. The motion information of a PU may include motion vector(s) of the PU and reference index(s) of the PU. When video encoder 20 indicates the motion information of a current PU using merge mode, video encoder 20 generates a merge candidate list. The merge candidate list includes a set of candidates. The candidates may indicate the motion information of PUs that spatially or temporally neighbor the current PU. Video encoder 20 may then select a candidate from the candidate list and may use the motion information indicated by the selected candidate as the motion information of the current PU. Furthermore, in merge mode, video encoder 20 may indicate the position in the candidate list of the selected candidate. Video decoder 30 may generate the same candidate list and may determine, based on the indication of the position of the selected candidate, the selected candidate. Video decoder 30 may then use the motion information of the selected candidate to generate predictive blocks for the current PU. In other words, video decoder 30 may generate, based at least in part on reference picture samples indicated by a selected candidate in the merge candidate list, a predictive block for the current PU.

AMVP mode is similar to merge mode in that video encoder 20 generates a candidate list and selects a candidate from the list of candidates. However, when video encoder 20 indicates the motion information of a current PU using AMVP mode, video encoder 20 may include, in the bitstream, a motion vector difference (MVD) for the current PU and a reference index in addition to indicating, in the bitstream, a position of the selected candidate in the candidate list. An MVD for the current PU may indicate a difference between a motion vector of the current PU and a motion vector of the selected candidate. In uni-prediction, video encoder 20 may indicate, in the bitstream, one MVD and one reference index for the current PU. In bi-prediction, video encoder 20 may indicate, in the bitstream, two MVDs and two reference indexes for the current PU.

Furthermore, when the motion information of a current PU is indicated using AMVP mode, video decoder 30 may generate the same candidate list and may determine, based on the indication of the position of the selected candidate, the selected candidate. Video decoder 30 may recover a motion vector of the current PU by adding a MVD to the motion vector of the selected candidate. Video decoder 30 may then use the recovered motion vector or motion vectors of the current PU to generate predictive blocks for the current PU.

A candidate in a merge candidate list or an AMVP candidate list that is based on the motion information of a PU that temporally neighbors a current PU (i.e., a PU that is in a different picture than the current PU) may be referred to as a temporal motion vector predictor (TMVP). To determine a TMVP, a video coder (e.g., video encoder 20 or video decoder 30) may firstly identify a reference picture that includes a PU that is co-located with the current PU. In other words, the video coder may identify a co-located picture. If the current slice of the current picture is a B slice, a syntax element (e.g., collocated_from_l0_flag) may be indicated in a slice header to indicate whether the co-located picture is from RefPicList0 or RefPicList1. After video decoder 30 identifies the reference picture list that includes the co-located picture, video decoder 30 may use another syntax element (e.g., collocated_ref_idx), which may be indicated in a slice header, to identify a picture (i.e., the co-located picture) in the identified reference picture list. Video decoder 30 may then identify a co-located PU by checking the co-located picture. The TMVP may indicate either the motion information of the right-bottom PU of the CU containing the co-located PU, or the motion information of the right-bottom PU within the center PU of the CU containing this PU. In other words, the TMVP may indicate the motion information of a PU that is in the reference picture and that covers a location that is co-located with a bottom right corner of the current PU, or the TMVP may indicate the motion information of a PU that is in the reference picture and that covers a location that is co-located with a center of the current PU.

When motion vectors identified by the above process are used to generate a candidate for AMVP or merge mode, the motion vectors may be scaled based on the temporal location (reflected by POC value). For instance, a video coder may increase the magnitude of a motion vector by greater amounts when a difference between the POC values between a current picture and a reference picture is greater than when a difference between the POC values of the current picture and the reference picture is less.

A PPS is a syntax structure containing syntax elements that apply to zero or more entire coded pictures. In HEVC Working Draft 6, a PPS may include an enable_temporal_mvp_flag syntax element. When a particular picture with temporal_id equal to 0 refers to a PPS having enable_temporal_mvp_flag equal to 0 (i.e., when VCL NAL units associated with the particular picture specify temporal identifiers equal to 0 and are associated with a PPS having an enable_temporal_mvp_flag syntax element equal to 0), a video coder may mark all reference pictures in a DPB as "unused for temporal motion vector prediction," and the video coder may use no motion vectors from pictures before that particular picture in decoding order as a TMVP in decoding of the particular picture or a picture after the particular picture in decoding order.

In SHEVC, a bitstream comprises a base layer and one or more enhancement layers. The base layer may be fully compatible with the base HEVC standard. The base layer may be decoded without reference to any of the enhancement layers. However, decoding of an enhancement layer may require the decoding of one or more lower layers of the bitstream. The enhancement layers may serve to increase the visual quality of decoded video data.

Some functionalities of SHEVC are similar to the implementation of the SVC extension for H.264/AVC. Some functionalities of the SVC extension for HEVC are inherited from H.264/AVC.

For example, the SVC extension of H.264/AVC provides inter-layer prediction for spatial scalability and signal-to-noise ratio (SNR) scalability based on texture, residue and motion. Spatial scalability enables enhancement layers to increase the resolution of lower layers. Spatial scalability in SVC has been generalized to any resolution ratio between two layers. SNR scalability can be realized by Coarse Granularity Scalability (CGS) or Medium Granularity Scalability (MGS). In SVC, two spatial layers or two CGS layers may belong to different dependency layers (indicated by a dependency_id syntax element in NAL unit header), while two MGS layers may belong to the same dependency layer. One dependency layer includes quality layers with quality_id from 0 to higher values, corresponding to quality enhancement layers. In SVC, inter-layer prediction methods may be used to reduce inter-layer redundancy.

The SVC extension of H.264/AVC supports inter-layer texture prediction. The coding mode using inter-layer texture prediction in the SVC extension of H.264/AVC is called "IntraBL" mode. To enable single-loop decoding, only the macroblocks (MBs) that have co-located MBs in the base layer coded as constrained intra modes can use inter-layer texture prediction mode. A constrained intra mode MB is an intra-coded MB that is coded without referring to any samples from the neighboring MBs that are inter-coded.

Furthermore, the SVC extension of H.264/AVC supports inter-layer residual prediction. If a current MB is indicated to use residual prediction, a co-located MB in the base layer for inter-layer prediction must be an inter MB (i.e., an MB coded using inter prediction) and the residue of the co-located MB may be upsampled according to a spatial resolution ratio. In general, the residue of a MB is the difference between an original version of the MB and a predictive block for the MB. The residue difference between the enhancement layer and that of the base layer is coded. Thus, instead of indicating the residue for the current MB, a video encoder may indicate the difference between the residue of the current MB and the residue of the co-located MB. A video decoder may use the residue of the co-located MB and the indicated residue difference to determine the residue of the current MB.

In addition, the SVC extension of H.264/AVC supports inter-layer motion prediction. When coding a current MB or a current MB partition in an enhancement layer, the co-located base layer motion vectors (i.e., the motion vectors of a base layer MB co-located with the current MB or current MB partition) may be scaled to generate predictors for the motion vectors of the current MB or the current MB partition. In addition, there is one MB type named base mode, for which the encoder sends one flag for each MB. If this flag is true and the corresponding base layer MB is not coded using intra prediction, then motion vectors, partitioning modes and reference indices are all derived from the base layer.

Figure 2:
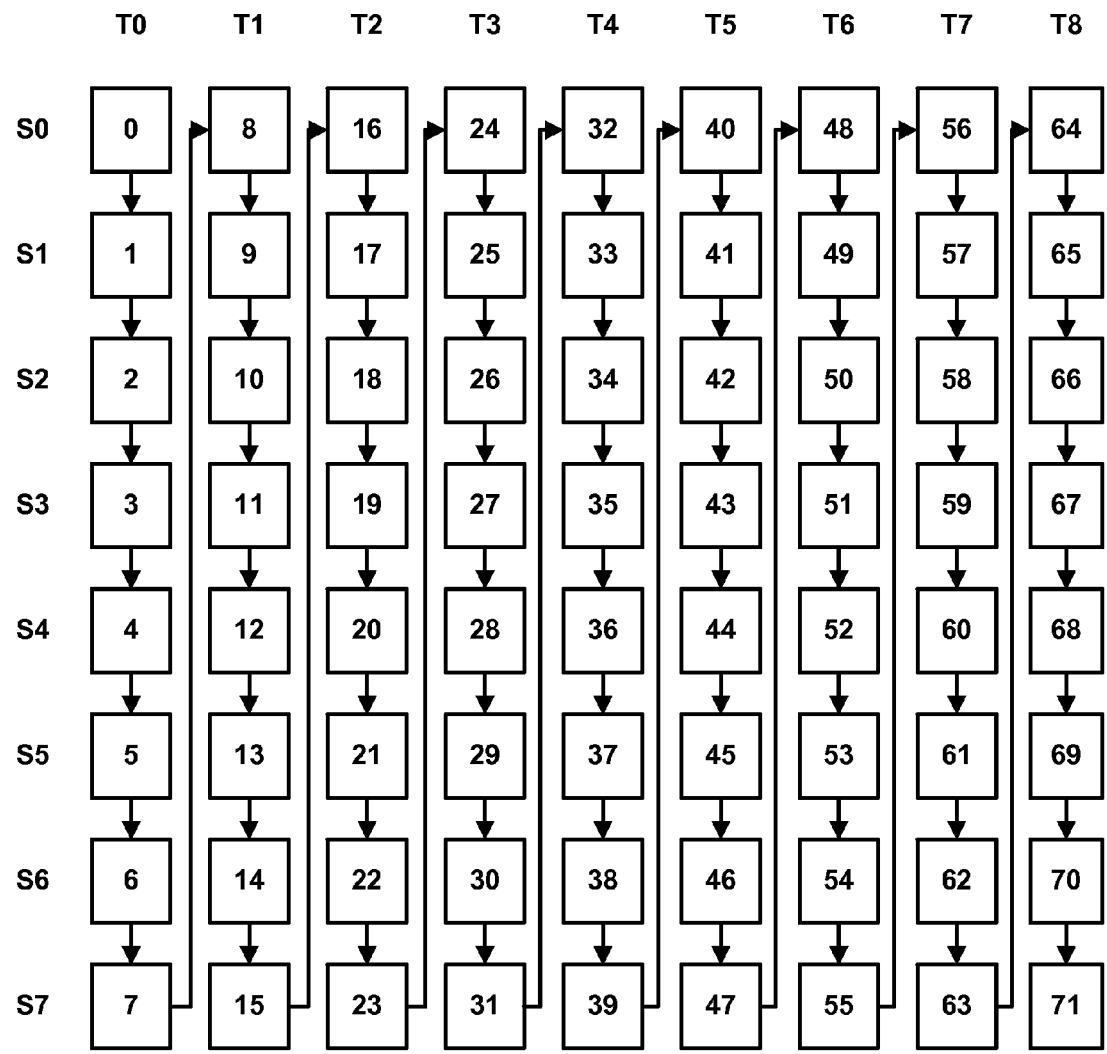
FIG. 2 is a conceptual diagram illustrating an example decoding order in a multi-view coding process.

FIG. 2 is a conceptual diagram illustrating an example decoding order in a multi-view coding process. The decoding order in the multi-view coding process may be a bitstream order. In the example of FIG. 2, each square corresponds to a view component. Columns of squares correspond to access units. That is, each column includes the views of a particular access unit. Each access unit may be defined to contain the coded pictures of all the views of a time instance. Rows of squares correspond to views. That is, each row includes view comments for a particular view over a series of access units. In the example of FIG. 2, the access units are labeled T0 . . . T7 and the views are labeled S0 . . . S7. Because each view component of an access unit is decoded before any view component of the next access unit, the decoding order of FIG. 2 may be referred to as time-first coding. As shown in the example of FIG. 2, the decoding order of access units may not be identical to the output or display order of the views.

In multi-view coding, there may be multiple views of the same scene from different viewpoints. The term "access unit" is used to refer to the set of pictures that correspond to the same time instance. Thus, video data may be conceptualized as a series of access units occurring over time. A "view component" may be a coded representation of a view in a single access unit. In this disclosure, a "view" may refer to a sequence of view components associated with the same view identifier.

Multi-view coding supports inter-view prediction. Inter-view prediction is similar to the inter prediction used in H.264/AVC or HEVC and may use the same syntax elements. However, when a video coder (e.g., video encoder 20 or video decoder 30) performs inter-view prediction on a current video unit (such as a macroblock or prediction unit (PU)), the video coder may use, as a reference picture, a picture that is in the same access unit as the current video unit, but in a different view. In contrast, conventional inter prediction only uses pictures in different access units as reference pictures.

In multi-view coding, a view may be referred to as a "base view" if a video decoder (e.g., video decoder 30) can decode pictures in the view without reference to pictures in any other view. When coding a current picture in one of the non-base views, a video coder (e.g., video encoder 20 or video decoder 30) may add a particular picture into a reference picture list if the particular picture is in a different view but within a same time instance (i.e. access unit) as the current picture. An inter-view prediction reference picture is a reference picture that is in a different view but within a same access unit as a current picture. Like other inter prediction reference pictures, the video coder may insert an inter-view prediction reference picture at any position of a reference picture list.

Figure 3:
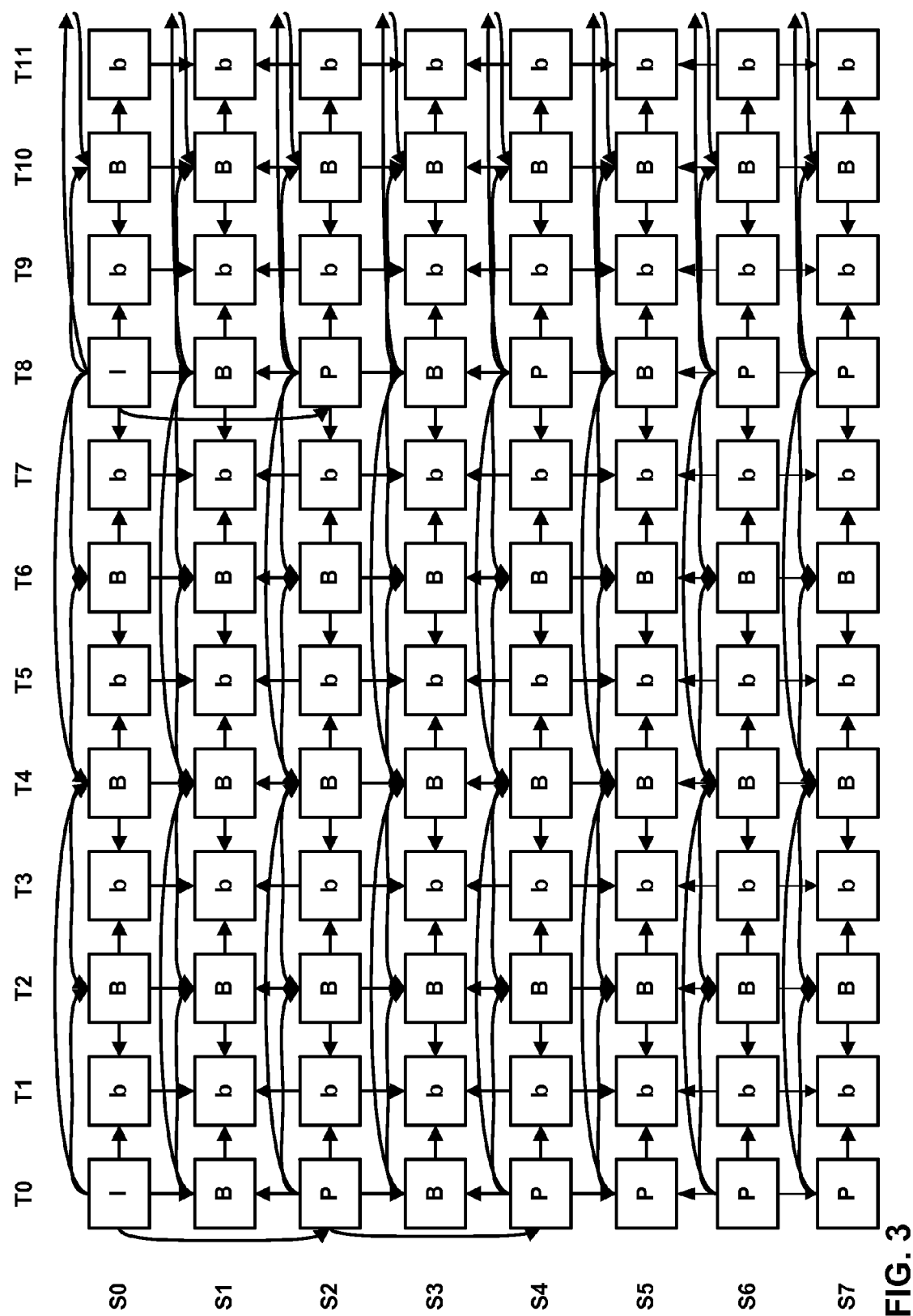
FIG. 3 is a conceptual diagram illustrating an example temporal and inter-view prediction structure.

FIG. 3 is a conceptual diagram illustrating an example multi-view prediction structure for multi-view coding. The multi-view prediction structure of FIG. 3 includes temporal and inter-view prediction. In the example of FIG. 3, each square corresponds to a view component. Squares labeled "I" are intra predicted view components. Squares labeled "P" are uni-directionally inter predicted view components. Squares labeled "B" and "b" are bi-directionally inter predicted view components. Squares labeled "b" may use squares labeled "B" as reference pictures. An arrow that points from a first square to a second square indicates that the first square is available in inter prediction as a reference picture for the second square. As indicated by the vertical arrows in FIG. 3, view components in different views of the same access unit may be available as reference pictures. The use of one view component of an access unit as a reference picture for another view component of the same access unit may be referred to as inter-view prediction.

In the MVC extension of H.264/AVC, inter-view prediction is supported by disparity motion compensation, which uses the syntax of the H.264/AVC motion compensation, but allows a picture in a different view to be used as a reference picture. Coding of two views may also be supported by the MVC extension of H.264/AVC. One of the advantages of the MVC extension of H.264/AVC is that an MVC encoder may take more than two views as a 3D video input and an MVC decoder may decode such a multiview representation. Consequently, any renderer with a MVC decoder may expect 3D video contents with more than two views.

3D-HEVC provides for multiple views of the same scene from different viewpoints. Part of the standardization efforts for 3D-HEVC includes the standardization of the multiview video codec based on HEVC. Similarly, in HEVC based 3DV, inter-view prediction based on the reconstructed view components from different views is enabled. Like MVC in H.264/AVC, 3D-HEVC supports inter-view prediction. In 3D-HEVC, inter-view prediction is similar to the motion compensation used in standard HEVC and may utilize the same or similar syntax elements. However, when a video coder performs inter-view prediction on a PU, the video coder may use, as a reference picture, a picture that is in the same access unit as the PU, but in a different view. In contrast, conventional motion compensation only uses pictures in different access units as reference pictures.

Furthermore, 3D-HEVC supports in-loop view synthesis prediction (VSP). When a video encoder uses VSP, the video encoder may generate a VSP picture based on previously-coded texture view components and depth view components of the same access unit. Moreover, the video encoder may generate the VSP picture as if the VSP picture were within the same view as the current picture being encoded. The video encoder may include the VSP picture in a list of reference pictures (e.g., list 0 or list 1) for the current picture. The pictures in the list of reference pictures are available for use as reference pictures during inter prediction of blocks of pictures in the same access unit.

In 3D-HEVC and SHEVC, coding efficiency may be increased by accessing one or more additional pictures when coding a CU, PU, or other type of video unit. For instance, in 3D video coding, scalable video coding or multi-standard video coding scenarios, coding efficiency can be increased by accessing an additional picture (for inter-prediction referencing), which may contain only samples, and no motion information. The one or more additional pictures may be generated externally. In other words, an additional picture may be generated by external means. Syntax elements associated with the one or more additional pictures may not be indicated in the bitstream. Accordingly, this disclosure may refer to such additional pictures as "external pictures."

The one or more external pictures may have the same spatial resolution (e.g., height and width in pixels) as the picture that is currently being coded (i.e., the current picture). The external pictures also have the same bit depth and chroma sampling format as those of the current picture. In one alternative, only sample values of each pixel are present for an external picture. When a CU or a PU is encoded using the external picture, the video encoder does not indicate, in the bitstream, any motion information for the CU or PU. Rather, when a CU or a PU is encoded using the external picture, a predictive block for the CU or PU may match a co-located block of the external picture, i.e., a block at the same position in the external picture as the position of the block to be coded in the current picture.

Current versions of the HEVC base specification do not support the use of such external pictures. That is, an interface to access an external picture is not defined in the current HEVC base specification. Thus, different extensions to the HEVC base specification may define multiple ways of accessing an additional (i.e., external) picture. Moreover, multiple changes may need to be made to syntax elements of coding tree units, CUs, PUs, etc., to enable the use of external pictures.

In accordance with the techniques of this disclosure, video encoder 20 may include, in a bitstream, a representation of a syntax element (e.g., a flag) that indicates whether a video unit (such as a CU or a PU) is predicted from at least one external picture. In this disclosure, a video unit (such as a CU or a PU) may be predicted from an external picture when a predictive block for the video unit is generated based, at least in part, on the external picture. For ease of explanation, this syntax element may be referred to herein as the "external picture flag." If the bitstream does not include layers other than a base layer, the external picture flag may always indicate that the video unit is not predicted from any external pictures (e.g., the external picture flag may always be equal to 0). Although this disclosure refers to a syntax element that indicates whether a video unit is generated based, at least in part, on an external picture as an "external picture flag," in some examples the syntax element may include more than 1 bit.

The external picture flag may always indicate that a video unit is not predicted from an external picture when a bitstream only includes a base layer. For instance, the external picture flag may always be equal to 0 for an HEVC base specification compliant bitstream. An HEVC base specification compliant bitstream does not include any enhancement layers or additional views. However, the HEVC base specification (and not an extension to the HEVC base specification) may specify decoding processes to use when the external picture flag is equal to 1. That is, a video coding specification that describes decoding a base layer of a bitstream that complies with a video coding standard may specify how to decode video units (e.g., CUs) that have external picture flags that indicate that the video units are predicted from one or more external pictures. In other words, a bitstream may comprise a base layer that conforms to a video coding standard that specifies a decoding process for video units predicted from external pictures. Furthermore, the HEVC base specification may indicate that one or more external pictures may be present and that the one or more external pictures are generated by external means. Each of the one or more external pictures may have the same spatial resolution as the current picture. Thus, the external picture flag may be present in bitstreams that conform to a base specification of a video coding standard and bitstreams that conform to any extension of the base specification. Moreover, because the decoding process associated with the external picture flag is specified in the base specification, the decoding process associated with the external picture flag may be the same regardless of whether the bitstream conforms to an extension of the base specification.

While the external picture flags of CUs indicated in bitstreams that only include base layers may always be equal to 0, the external picture flags of CUs indicated in bitstreams that include multiple layers (e.g., bitstreams that include enhancement layers for SVC or layers for additional views in 3DV) may be equal to 0 or 1. That is, the external picture flags of CUs indicated in bitstreams that include multiple layers may indicate that the CUs either are or are not predicted from one or more external pictures. In this way, one or more example techniques of this disclosure may be used, for example, for a SVC extension of HEVC based on either a HEVC-compatible base layer or an H.264/AVC compatible base layer. Furthermore, one or more example techniques of this disclosure may be used for multi-view video coding of HEVC with either a HEVC-compatible base view or an H.264/AVC-compatible base view. In at least some instances where the bitstream includes multiple layers that correspond to different views, the external pictures may be VSP pictures. In other words, the techniques of this disclosure may be used in a way that an additional picture is a VSP picture (i.e., a picture based on texture and depth of one or more reference views) in the context of 3D video coding.

In one example, a slice header syntax structure for a slice may include a syntax element (additional_pics_flag) that indicates whether at least one external picture is used to predict a CU of the slice. In this example, the slice header syntax structure may also include a syntax element (num_additional_pics_minus1) that indicates the number of additional pictures used to predict CUs of the slice. Furthermore, a CU may include an external picture flag (add_pred_cu_flag) if the additional_pics_flag indicates that at least one external picture is used to predict a CU of the slice.

As mentioned above, the external picture flag (add_pred_cu_flag) may indicate whether the CU is predicted from an external picture. In this example, various syntax elements may be omitted from the CU if the external picture flag indicates that the CU is predicted from an external picture. For example, a skip flag, a prediction mode flag, a partition mode indicator, PU syntax structures, and a no residual data flag may be omitted from the CU if the external picture flag indicates that the CU is predicted from an external picture.

In some examples, there may be multiple external pictures. In one example where there are multiple external pictures, a syntax structure associated with a CU may include a syntax element (add_pic_idx) that specifies an index to a position, within a list of external pictures, of an external picture from which the CU is predicted. In some examples, when the add_pic_idx syntax element is not present, a video decoder may infer the add_pic_idx syntax element to be equal to 0. That is, when the add_pic_idx syntax element is not present, the video decoder may infer that the CU is predicted from a first external picture in the list of external pictures. In this way, video encoder 20 may generate, in a syntax structure associated with a CU, an index syntax element that specifies an index to an external picture in a list of external pictures. Similarly, video decoder 30 may obtain, from a syntax structure associated with a CU, an index syntax element that specifies an index to an external picture in a list of external pictures.

In other examples, video encoder 20 may include the add_pred_cu_flag syntax element in a coding tree syntax structure or a PU. An add_pred_cu_flag syntax element included in a coding tree syntax structure may indicate whether an individual CU or multiple CUs are predicted from an external picture. An add_pred_cu_flag syntax element included in a PU may indicate whether the PU is predicted from an external picture.

When multiple additional pictures are available, denoted as AddtPic, the additional picture may be identified as AddtPic[add_pic_idx] for a given CU. When there is only one additional picture, the additional picture (i.e., external picture) is denoted directly as AddtPic. In some examples, the following is performed only when add_pred_cu_flag is equal to 1. Assume that a texture picture (TexturePic) is equal to AddtPic when there is only one reference and AddtPic[add_pic_idx] when there are multiple additional pictures. For each color component, the block co-located to the current CU is copied as the predictor for the current CU.

Video encoder 20 may further indicate residual data for the current CU with the add_pred_cu_flag syntax element equal to 1.

The techniques of this disclosure may also apply to multi-standard video codecs. In a multi-standard video codec, a first video coding standard is used to code a base layer of a bitstream and a second video coding standard is used to code one or more additional layers of the same bitstream. In other words, the video data bitstream may comprise a base layer and one or more additional layers, wherein the base layer conforms to a first video coding standard and the additional layers conform to a second, different video coding standard. The one or more additional layers may comprise one or more enhancement layers or comprise one or more views. For example, H.264/AVC may be used to code a base layer/view of a bitstream and 3D-HEVC or SHEVC may be used to code enhancement layers or non-base views of the same bitstream. In some such examples, an external picture flag may be specified in either the first or the second video coding standard.

Figure 4:
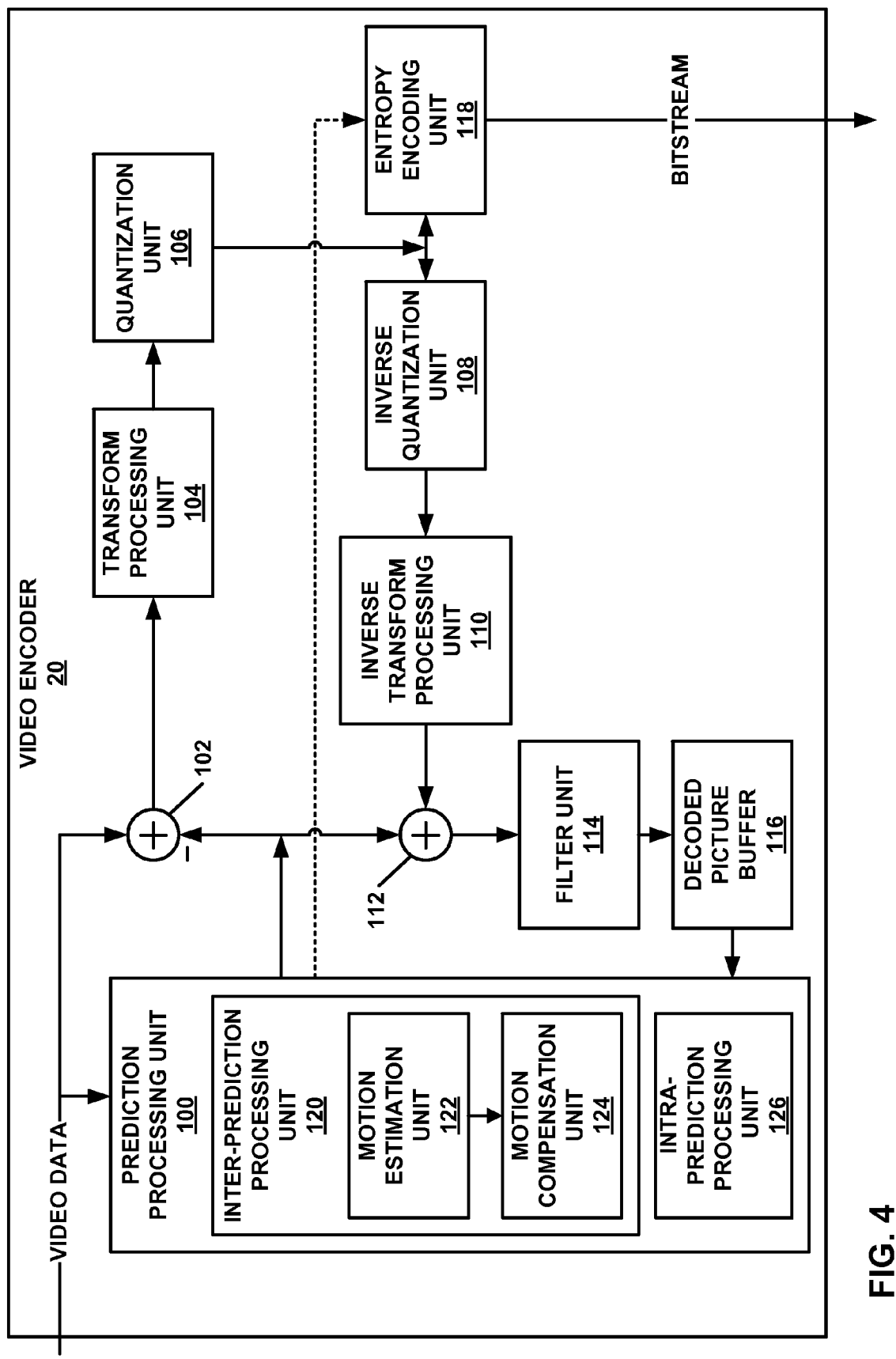
FIG. 4 is a block diagram illustrating an example video encoder that may implement the techniques described in this disclosure.

FIG. 4 is a block diagram illustrating an example video encoder 20 that may implement the techniques of this disclosure. FIG. 4 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 4, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 includes a motion estimation unit 122 and a motion compensation unit 124. In other examples, video encoder 20 may include more, fewer, or different functional components.

Video encoder 20 may receive video data. Video encoder 20 may encode each CTU in a slice of a picture of the video data. The CTUs of the picture may be associated with equally-sized luma coding tree blocks (CTBs) and corresponding chroma CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 120 may generate predictive data for a PU by performing inter prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter prediction on the PU.

If a PU is in a P slice, motion estimation unit 122 may search the reference pictures in a list of reference pictures (e.g., "RefPicList0") for a reference region for the PU. The reference region for the PU may be a region, within a reference picture, that contains sample blocks that most closely correspond to the sample blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current decoded picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a sample block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference region indicated by the motion vector of the PU.

To perform bi-directional inter prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference location associated with the reference regions and a sample block of the PU. The motion information of the PU may include the reference indexes and the motion vectors of the PU. Motion compensation unit 124 may generate the predictive blocks of the PU based at least in part on actual or interpolated samples at the reference region indicated by the motion vector of the PU.

Intra-prediction processing unit 126 may generate predictive data for a PU by performing intra prediction on the PU. The predictive data for the PU may include predictive blocks for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra prediction modes, e.g., 33 directional intra prediction modes. In some examples, the number of intra prediction modes may depend on the size of the region associated with the PU.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the luma, Cb and Cr coding block of a CU and the selected predictive luma, Cb and Cr blocks of the PUs of the CU, a luma, Cb and Cr residual blocks of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT. In this disclosure, an RQT may also be referred to as a "transform tree."

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m.

Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. Quantization may introduce loss of information, thus quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 20 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes representations of syntax elements, such as entropy-encoded data generated by entropy encoding unit 118.

In accordance with one or more example techniques of this disclosure, video encoder 20 may include, in a bitstream, a representation of a syntax element (e.g., an external picture flag) that indicates whether a video unit (such as a CU or a PU) is predicted from at least one external picture. In some examples, video encoder 20 may generate a slice header for a current slice. The slice header may include a syntax element that indicates whether any CU of the current slice is predicted from one or more external pictures. Furthermore, the slice header may include a syntax element that indicates how many external pictures are used to predict CUs of the current slice. Table 1, below, shows an example syntax for a slice header. Italicized portions of Table 1 indicate elements not included in the slice header syntax of HEVC Working Draft 6.

TABLE 1

Slice header syntax

| | Descriptor |
|---|---|
| slice_header( ) { | |
|     first_slice_in_pic_flag | u(1) |
|     pic_parameter_set_id | ue(v) |
|     if( !first_slice_in_pic_flag ) | |
|         slice_address | u(v) |
|     if( dependent_slice_enabled_flag && !first_slice_in_pic_flag ) | |
|         dependent_slice_flag | u(1) |
|     if( !dependent_slice_flag ) { | |
|         slice_type | ue(v) |
|         additional_pics_flag | u(1) |
|         if ( additional_pics_flag ) | |
|             num_additional_pics_minus1 | ue(v) |
|         if( output_flag_present_flag ) | |
|             pic_output_flag | u(1) |
|         if( separate_colour_plane_flag = = 1 ) | |
|             colour_plane_id | u(2) |
|         if( RapPicFlag ) { | |
|             rap_pic_id | ue(v) |
|             no_output_of_prior_pics_flag | u(1) |
|         } | |
|         if( !IdrPicFlag ) { | |
|             pic_order_cnt_lsb | u(v) |
|             short_term_ref_pic_set_sps_flag | u(1) |
|             if( !short_term_ref_pic_set_sps_flag ) | |
|                 short_term_ref_pic_set( num_short_term_ref_pic_sets ) | |
|             Else | |
|                 short_term_ref_pic_set_idx | u(v) |
|             if( long_term_ref_pics_present_flag ) { | |
|                 num_long_term_pics | ue(v) |
|                 for( i = 0; i < num_long_term_pics; i++ ) { | |
|                     poc_lsb_lt[ i ] | u(v) |
|                     delta_poc_msb_present_flag[ i ] | u(1) |
|                     if( delta_poc_msb_present_flag[ i ] ) | |
|                         delta_poc_msb_cycle_lt[ i ] | ue(v) |
|                     used_by_curr_pic_lt_flag[ i ] | u(1) |
|                 } | |
|             } | |
|         } | |
|         if( sample_adaptive_offset_enabled_flag ) { | |
|             slice_sao_interleaving_flag | u(1) |
|             slice_sample_adaptive_offset_flag | u(1) |
|             if( slice_sao_interleaving_flag && | |
|                 slice_sample_adaptive_offset_flag ) { | |
|                 sao_cb_enable_flag | u(1) |
|                 sao_cr_enable_flag | u(1) |
|             } | |
|         } | |
|         if( ( sample_adaptive_offset_enabled_flag && !slice_sao_interleaving_flag ) \|\| | |
|             adaptive_loop_filter_enabled_flag ) | |
|             aps_id | ue(v) |
|         if( slice_type = = P \|\| slice_type = = B ) { | |
|             if( sps_temporal_mvp_enable_flag ) | |
|                 pic_temporal_mvp_enable_flag | u(1) |
|             num_ref_idx_active_override_flag | u(1) |
|             if( num_ref_idx_active_override_flag ) { | |
|                 num_ref_idx_l0_active_minus1 | ue(v) |
|                 if( slice_type = = B ) | |
|                     num_ref_idx_l1_active_minus1 | ue(v) |
|             } | |
|         } | |
|         if( lists_modification_present_flag ) | |
|             ref_pic_list_modification( ) | |
|         if( slice_type = = B ) | |
|             mvd_l1_zero_flag | u(1) |
|         if( cabac_init_present_flag && slice_type != I ) | |
|             cabac_init_flag | u(1) |
|         slice_qp_delta | se(v) |
|         if( deblocking_filter_control_present_flag ) { | |
|             if( deblocking_filter_override_enabled_flag ) | |
|                 deblocking_filter_override_flag | u(1) |
|             if( deblocking_filter_overriding_flag ) { | |
|                 slice_header_disable_deblocking_filter_flag | u(1) |
|                 if( !disable_deblocking_filter_flag ) { | |
|                     slice_header_beta_offset_div2 | se(v) |
|                     slice_header_tc_offset_div2 | se(v) |
|                 } | |
|             } | |

TABLE 1-continued

Slice header syntax

```
slice_header( ) {                                                               Descriptor
        }
        if( pic_temporal_mvp_enable_flag ) {
            if( slice_type = = B )
                collocated_from_l0_flag                                         u(1)
            if( slicetype != I &&
                ((collocated_from_l0_flag && num_ref_idx_l0_active_minus1 > 0) | |
                    (!collocated_from_l0_flag && num_ref_idx_l1_active_minus1 > 0) ) )
                collocated_ref_idx                                              ue(v)
        }
        if( ( weighted_pred_flag && slice_type = = P) | |
            ( weighted_bipred_idc = = 1 && slice_type = = B ) )
            pred_weight_table( )
        if( slice_type = = P | | slice_type = = B )
            five_minus_max_num_merge_cand                                       ue(v)
        if( adaptive_loop_filter_enabled_flag ) {
            slice_adaptive_loop_filter_flag                                     u(1)
                if( slice_adaptive_loop_filter_flag && alf_coef_in_slice_flag )
                    alf_param( )
                if( slice_adaptive_loop_filter_flag && !alf_coef_in_slice_flag )
                    alf_cu_control_param( )
        }
        if( seq_loop_filter_across_slices_enabled_flag &&
            ( slice_adaptive_loop_filter_flag | | slice_sample_adaptive_offset_flag | |
                !disable_deblocking_filter_flag ) )
            slice_loop_filter_across_slices_enabled_flag                        u(1)
    }
    if( tiles_or_entropy_coding_sync_idc = = 1 | |
        tiles_or_entropy_coding_sync_idc = = 2 ) {
        num_entry_point_offsets                                                 ue(v)
        if( num_entry_point_offsets > 0 ) {
            offset_len_minus1                                                   ue(v)
            for( i = 0; i < num_entry_point_offsets; i++ )
                entry_point_offset[ i ]                                         u(v)
        }
    }
    if( slice_header_extension_present_flag ) {
        slice_header_extension_length                                           ue(v)
        for( i = 0; i < slice_header_extension_length; i++)
            slice_header_extension_data_byte                                    u(8)
    }
    byte_alignment( )
}
```

In the example syntax of Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, syntax elements having descriptors of the form u(n), where n is a non-negative integer, are unsigned values of length n. Syntax elements having descriptors of the form se(v) are signed integer Exp-Golomb-coded syntax systems with the left bit first. Syntax elements having descriptors of the form ae(v) are CABAC coded syntax elements.

Furthermore, in the example syntax of Table 1, a slice header may include an additional_pics_flag syntax element. The additional_pics_flag syntax element equal to 1 indicates at least one additional (i.e., external) picture is used to predict the CUs of the current slice. The additional picture is different from any picture in any reference picture list of the current slice. The additional_pics_flag syntax element equal to 0 indicates no additional (i.e., external) picture is used to predict the CUs of the current slice.

Thus, video encoder 20 may generate a slice header syntax structure for a slice. The slice header syntax structure may include a syntax element (e.g., additional_pics_flag) that indicates whether any CUs of the slice are predicted from any external picture. Similarly, video decoder 30 may decode, from the bitstream, a slice header syntax structure for a slice. As before, the slice header syntax structure may include a syntax element that indicates whether any CUs of the slice are predicted from any external picture.

In the HEVC base specification, the additional_pics_flag syntax element may always be equal to 0. In other examples, the additional_pics_flag syntax element is not present in the HEVC base specification. Furthermore, in still other examples, the presence of the additional_pics_flag syntax element may depend on additional signaling. The additional signaling may be in a SPS, a PPS, a video parameter set (VPS), or another syntax structure signaled in a bitstream. A VPS is a syntax structure that may contain syntax elements that apply to zero or more entire coded video sequences. A SPS is a syntax structure that may contain syntax elements that apply to zero or more entire coded video sequences. A coded video sequence is a sequence of access units that consists, in decoding order, of an Instantaneous Decoding Refresh (IDR) access unit followed by zero or more non-IDR access units that include all subsequent access units up to but not including any subsequent IDR access unit.

In the example syntax of Table 1, a slice header may include a num_additional_pics_minus1 syntax element. In some examples, the num_additional_pics_minus1, plus 1, specifies the number of additional pictures used to predict the CUs of the current slice. Thus, video encoder 20 may generate, in a slice header syntax structure for a slice, a syntax element that indicates the number of external pictures used to predict the CUs of the slice. Similarly, video decoder 30 may obtain, from a slice header syntax structure for a slice, a syntax element that indicates the number of external pictures used to predict the CUs of the slice. In an alternative example, the num_additional_pics_minus1 syntax element is not included and is always derived to be equal to 0.

In another alternative example, the additional_pics_enabled_flag syntax element is included in a VPS, a SPS, a PPS, or an adaptation parameter set (APS), to indicate whether a slice referring to such a parameter set uses an additional picture for prediction. An APS may be a set of parameters applicable to a picture. The values of syntax elements in APSs may be more likely to change than parameters in PPSs. Thus, video encoder 20 may generate, in a parameter set, a syntax element (e.g., additional_pics_enabled_flag) that indicates whether any CU of a slice referring to the parameter set is predicted from any external picture. Similarly, video decoder 30 may obtain, from a parameter set, a syntax element (e.g., additional_pics_enabled_flag) that indicates whether any CU of a slice referring to the parameter set is predicted from any external picture.

In another alternative example, the num_additional_pics_enabled_minus1 syntax element, plus 1, is included in a VPS, SPS, PPS, or APS, to indicate the maximum number of additional pictures that can be used by slices referring to such a parameter set. Thus, video encoder 20 may generate, in a parameter set, a syntax element (e.g., num_additional_pics_enabled_minus1) that indicates a maximum number of external pictures that are usable by slices referring to the parameter set. Similarly, video decoder 30 may obtain, from the parameter set, the syntax element (e.g., num_additional_pics_enabled_minus1) that indicates the maximum number of additional picture that are usable by slices referring to the parameter set. In various examples, the parameter set may be one of a VPS, a SPS, a PPS, or an APS.

Furthermore, video encoder 20 may generate a syntax structure associated with a CU. In accordance with one or more example techniques of this disclosure, the syntax structure associated with a CU may conform to the example syntax shown in Table 2, below. Italicized portions of Table 2 indicate elements not included in the syntax for syntax structures associated with CUs shown in HEVC Working Draft 6.

TABLE 2

Coding unit syntax

| | Descriptor |
|---|---|
| coding_unit( x0, y0, log2CbSize ) { | |
|   CurrCbAddrTS = MinCbAddrZS[ x0 >> Log2MinCbSize ][ y0 >> Log2MinCbSize ] | |
|   if ( additional_pics_flag ) | |
|     add_pred_cu_flag[ x0 ][ y0 ] | ae(v) |
|   if(!add_pred_cu_flag[ x0 ][ y0 ]){ | |
|   if( slice_type != I ) | |
|     skip_flag[ x0 ][ y0 ] | ae(v) |
|   if( skip_flag[ x0 ][ y0 ] ) | |
|     prediction_unit( x0, y0 , log2CbSize ) | |
|   else { | |
|     if( slice_type != I ) | |
|       pred_mode_flag | ae(v) |
|       if( PredMode != MODE_INTRA \|\| log2CbSize = = Log2MinCbSize ) | |
|         part_mode | ae(v) |
|     x1 = x0 + ( ( 1 << log2CbSize ) >> 1 ) | |
|     y1 = y0 + ( ( 1 << log2CbSize ) >> 1 ) | |
|     x2 = x1 − ( ( 1 << log2CbSize ) >> 2 ) | |
|     y2 = y1 − ( ( 1 << log2CbSize ) >> 2 ) | |
|     x3 = x1 + ( ( 1 << log2CbSize ) >> 2 ) | |
|     y3 = y1 + ( ( 1 << log2CbSize ) >> 2 ) | |
|     if( PartMode = = PART_2Nx2N ) | |
|       prediction_unit( x0, y0 , log2CbSize ) | |
|     else if( PartMode = = PART_2NxN ) { | |
|       prediction_unit( x0, y0 , log2CbSize ) | |
|       prediction_unit( x0, y1 , log2CbSize ) | |
|     } else if( PartMode = = PART_Nx2N ) { | |
|       prediction_unit( x0, y0 , log2CbSize ) | |
|       prediction_unit( x1, y0 , log2CbSize ) | |
|     } else if( PartMode = = PART_2NxnU ) { | |
|       prediction_unit( x0, y0 , log2CbSize ) | |
|       prediction_unit( x0, y2 , log2CbSize ) | |
|     } else if( PartMode = = PART_2NxnD ) { | |
|       prediction_unit( x0, y0 , log2CbSize ) | |
|       prediction_unit( x0, y3 , log2CbSize ) | |
|     } else if( PartMode = = PART_nLx2N ) { | |
|       prediction_unit( x0, y0 , log2CbSize ) | |
|       prediction_unit( x2, y0 , log2CbSize ) | |
|     } else if( PartMode = = PART_nRx2N ) { | |
|       prediction_unit( x0, y0 , log2CbSize ) | |
|       prediction_unit( x3, y0 , log2CbSize ) | |
|     } else { /* PART_NxN */ | |
|       prediction_unit( x0, y0 , log2CbSize ) | |
|       prediction_unit( x1, y0 , log2CbSize ) | |
|       prediction_unit( x0, y1 , log2CbSize ) | |
|       prediction_unit( x1, y1 , log2CbSize ) | |
|     } | |
|   } | |
| } | |

TABLE 2-continued

Coding unit syntax

```
coding_unit( x0, y0, log2CbSize ) {                                                Descriptor
    if (!skip_flag[ x0 ][ y0 ] ) {
        if( !pcm_flag ) {
            if( ( PredMode != MODE_INTRA &&
                !(PartMode = = PART_2Nx2N && merge_flag[x0][y0])) | |
                add_pred_cu_flag[ x0 ][ y0 ]))
                no_residual_data_flag                                               ae(v)
            if( !no_residual_data flag ) {
                MaxTrafoDepth = ( PredMode = = MODE_INTRA ?
                    max_transform_hierarchy_depth_intra + IntraSplitFlag
:
                    max_transform_hierarchy_depth_inter )
                transform_tree( x0, y0, log2CbSize, log2CbSize, log2CbSize, 0, 0 )
            }
        }
    }
}
```

In the example syntax of Table 2, a CU may include an add_pred_cu_flag[x0][y0] syntax element. The values x0 and y0 indicate a position, within a current picture, associated with the CU. The add_pred_cu_flag[x0][y0] syntax element equal to 1 specifies that for a current CU, when decoding an I, P or B slice, no syntax elements related to motion vector prediction and intra prediction are present. That is, if the add_pred_cu_flag[x0][y0] syntax element is equal to 1, video encoder 20 does not indicate, in the bitstream, the motion information of PUs of the current CU. The add_pred_cu_flag[x0][y0] syntax element equal to 0 specifies that motion vector prediction and/or intra prediction syntax elements are present in the syntax structure associated with the current CU. When the add_pred_cu_flag [x0][y0] syntax element is equal to 1, the whole CU may be predicted from an additional (i.e., external) picture, with possible residual data included in a transform tree for the current CU. When the add_pred_cu_flag[x0][y0] syntax element is not present, video decoder 30 may infer the value of the add_pred_cu_flag[x0][y0] syntax element to be equal to 0.

Thus, video encoder 20 may generate, in a syntax structure associated with a CU, an external picture flag (e.g., add_pred_cu_flag[x0][y0]) that indicates whether the CU is predicted from an external picture. Similarly, video decoder 30 may decode, from a syntax structure associated with a CU, an external picture flag (e.g., add_pred_cu_flag[x0] [y0]) that indicates whether the CU is predicted from an external picture. Moreover, when a CU is not predicted from an external picture, video encoder 20 may generate, in a syntax structure associated with the CU, a syntax structure associated with a PU of the CU (e.g., a prediction_unit syntax structure). However, when the CU is predicted from an external picture, video encoder 20 may refrain from generating, in the syntax structure associated with the CU, a syntax structure for any PU of the CU. Similarly, in response to determining that an external picture flag (e.g., add_pred_cu_flag[x0][y0]) indicates that the CU is not predicted from an external picture, video decoder 30 may obtain, from a syntax structure associated with the CU, a syntax structure associated with a PU of the CU. However, in response to determining that the external picture flag (e.g., add_pred_cu_flag[x0][y0]) indicates that the CU is predicted from an external picture, video decoder 30 may refrain from obtaining, from the syntax structure associated with the CU, a syntax structure for any PU of the CU.

If the transform tree of a CU includes an add_pred_cu_flag[x0][y0] syntax element equal to 1, video decoder 30 may treat the CU as if the CU is an inter CU coded in a 2N×2N partition mode. In some examples, the HEVC base specification may specify that the add_pred_cu_flag[x0][y0] syntax element is never present in CUs. In other examples, the HEVC base specification may specify that the add_pred_cu_flag[x0][y0] syntax element is always present in CUs, but that the value of the add_pred_cu_flag [x0][y0] syntax element is always equal to 0.

In addition, when an add_pred_cu_flag[x0][y0] syntax element of a CU is equal to 1, the CU may be considered as unavailable for motion vector prediction. For instance, when the add_pred_cu_flag[x0][y0] syntax element of a current CU is equal to 1, video decoder 30 does not generate, in a merge candidate list or an AMVP candidate list, a candidate that specifies motion information of the current CU.

In the example syntax of Table 2, the syntax structure associated with a CU may include an add_pred_cu_flag[x0] [y0] syntax element only if the additional_pics_flag variable is equal to 1. Video decoder 30 may set the value of the additional_pics_flag variable based on an additional_pics_flag syntax element in a slice header associated with the CU. In an alternative example, video encoder 20 may always include the add_pred_cu_flag[x0][y0] syntax element in a syntax structure associated with the CU regardless of the value of the additional_pics_flag variable.

Alternatively, the add_pred_cu_flag[x0][y0] syntax element may be present in a syntax structure associated with a CU after a skip_flag syntax element in the syntax structure associated with the CU. In one alternative example, the add_pred_cu_flag[x0][y0] syntax element is present in a syntax structure associated with a CU regardless of the value of the skip_flag syntax element in a syntax structure associated with the CU and, when both the add_pred_cu_flag [x0][y0] syntax element and the skip_flag syntax element are equal to 1, the current CU is predicted from an additional picture without any residue. In one alternative solution, the add_pred_cu_flag[x0][y0] syntax element is only present in a syntax structure associated with a CU when the skip_flag syntax element of the CU is equal to 0. In this example, the skip_flag syntax element equal to 1 implies the CU is not predicted from the additional picture.

Furthermore, in the example of Table 2, a CU may include a no_residual_data_flag syntax element when the add_pred_cu_flag[x0][y0] syntax element is equal to 1. The no_residual_data_flag syntax element equal to 1 may specify that no residual data are present in the syntax structure for the current CU. The no_residual_data_flag syntax element equal to 0 may specify that residual data are present in the syntax structure for the current CU. Thus, in the example of Table 2, when the current CU is predicted from an external picture, video encoder 20 may generate, in a syntax structure associated with the current CU, a residual data syntax element (e.g., no_residual_data_flag) that indicates whether residual data are present in the syntax structure associated with the current CU. Similarly, in response to determining that an external picture flag (e.g., add_pred_cu_flag[x0][y0]) indicates that a CU is predicted from an external picture, video decoder 30 may obtain, from a syntax structure associated with the CU, a residual data syntax element (e.g., no_residual_data_flag) that indicates whether residual data are present in the syntax structure associated with the CU.

Table 3, below, shows an example portion of an alternative syntax of a syntax structure associated with a CU. Portions of the syntax of the syntax structure associated with the CU not shown in Table 3 may be the same as the syntax shown in Table 2. Italicized portions of Table 3 indicate elements not included in the syntax of syntax structures associated with CUs described in HEVC Working Draft 6. Bold italicized portions of Table 3 indicate elements not included in the syntax of syntax structures associated with CUs shown in Table 2.

TABLE 3

Coding unit syntax

| coding_unit( x0, y0, log2CbSize ) { | Descriptor |
|---|---|
| CurrCbAddrTS = MinCbAddrZS[ x0 >> Log2MinCbSize ][ y0 >> Log2MinCbSize ] | |
| if ( additional_pics_flag ) { | |
|     add_pred_cu_flag[ x0 ][ y0 ] | ae(v) |
|     if( num_additional_pics_minus1 ) | |
|         add_pic_idx[ x0 ][ y0 ] | ae(v) |
| } | |
| ... | |

In the example syntax of Table 3, a syntax structure associated with a current CU may include an add_pic_idx [x0][y0] syntax element. As before, x0 and y0 indicate a position of the current CU within a picture associated with the current CU. The add_pic_idx[x0][y0] syntax element specifies the index to an additional (i.e., external) picture of a list of additional pictures, from which the current CU is predicted. When the add_pic_idx[x0][y0] syntax element is not present in the syntax structure associated with the current CU, video decoder 30 may infer the add_pic_idx [x0][y0] syntax element to be equal to 0.

In an alternative example, video encoder 20 may include, in a coding tree or a PU, an external picture flag similar to the add_pred_cu_flag syntax element described above. When an external picture flag, which may be the first syntax element of a coding tree, has a value equal to 1, the coding tree may be partitioned into CUs with the largest CU size and an add_pred_cu_flag syntax element for each LCU is equal to 1. Thus, video encoder 20 may generate, in a coding tree, a syntax element that indicates whether a video unit is predicted from an external picture, where the video unit is a CU that has a largest coding unit size. Similarly, video decoder 30 may obtain, from a coding tree, a syntax element that indicates whether a video unit is predicted from an external picture, where the video unit is a coding unit that has a largest coding unit size.

In some examples, the HEVC base specification (or other base video coding specifications) may specify that the external picture flag is always set to 0. In other examples, the HEVC base specification (or other base video coding specifications) may specify that the external picture flag is never present. In other examples, the HEVC base specification (or other base video coding specifications) may specify that the external picture flag is always present but always has a value equal to 0.

A prediction_unit syntax structure is a syntax structure that contains syntax elements associated with a PU. If a PU is coded using intra prediction, the prediction_unit syntax structure associated with the PU includes a set of syntax elements associated with intra prediction. The set of syntax elements associated with intra prediction may be referred to herein as the intra mode branch of the prediction_unit syntax structure or the intra mode branch of the PU. Similarly, if a PU is encoded using inter prediction, the prediction_unit syntax structure includes a set of syntax elements associated with inter prediction. The set of syntax elements associated with inter prediction may be referred to herein as the inter mode branch of the prediction_unit syntax structure or the inter mode branch of the PU. Example syntax elements associated with inter prediction may include a merge_flag syntax element that indicates whether motion information of the PU is indicated using merge mode or AMVP mode, an inter_pred_flag syntax element that specifies whether uni-prediction or bi-prediction is used, syntax elements that indicate selected candidates in merge or AMVP candidate lists, and syntax elements that indicate MVDs.

In some examples where video encoder 20 includes an external picture flag in a syntax structure associated with a PU of a current CU, video encoder 20 may include the syntax element as the first syntax element in an inter mode branch of a prediction_unit syntax structure for the PU. In this example, when the external picture flag indicates that the current CU is predicted from an external picture, the current CU may be treated as an inter prediction mode CU. In this way, video encoder 20 may generate, in an inter mode branch of a PU, an external picture flag that indicates whether the PU is predicted from an external picture. Similarly, video decoder 30 may obtain, from an inter mode branch of a PU, an external picture flag that indicates whether the PU is predicted from an external picture.

In an alternative example, video encoder 20 may include an external picture flag in an inter mode branch of a prediction_unit syntax for a given reference picture list of a PU. When video encoder 20 includes an external picture flag for a given reference picture list (e.g., for RefPicListX) in the bitstream, the prediction from RefPicListX may be replaced by the prediction from an additional (i.e., external) picture. As indicated above, a prediction_unit syntax structure includes an inter mode branch that includes syntax elements associated with inter prediction. The inter mode branch of a prediction_unit syntax structure includes a set of syntax elements associated with List 0 and another set of syntax elements associated with List 1. This disclosure may refer to the set of syntax elements associated with List 0 as the inter mode branch for List 0 and may refer to the set of syntax elements associated with List 1 as the inter mode branch for List 1. Example syntax elements associated with a reference picture list may include syntax elements that indicate an index of a candidate in a merge candidate list or an AMVP candidate list, syntax elements associated with MVDs, and so on.

In this example, when video encoder 20 includes an external picture flag in an inter mode branch for a particular reference picture list and the external picture flag indicates that the CU is predicted from an external picture, video encoder 20 does not generate, and video decoder 30 does not obtain, any additional syntax elements associated with the particular reference picture list in the prediction_unit syntax structure. However, if the PU is in a B slice, video encoder 20 may generate, and video decoder 30 may obtain, syntax elements associated with another reference picture list in the prediction_unit syntax structure. For example, video encoder 20 may generate, and video decoder 30 may obtain, an external picture flag in an inter mode branch for List 0 (i.e., an external picture flag for List 0) and an external picture flag in an inter mode branch for List 1 (i.e., an external picture flag for List 1). In this example, the external picture flag for List 0 may indicate that an external picture is used as a reference picture for the PU and the external picture flag for List 1 may indicate that a reference picture in List 1 is used as a reference picture for the PU. Furthermore, in this example, video decoder 30 may generate a predictive block for the PU based on a co-located block of the external picture and a block of a reference picture in List 1. A similar example may be provided in which List 0 is substituted with List 1 and List 1 is substituted with List 0.

In this way, a syntax structure associated with a PU may include an inter mode branch for a particular reference picture list. Video encoder 20 may generate, in the inter mode branch for the particular reference picture list, an external picture flag that indicates whether the PU is predicted from an external picture. Similarly, video decoder 30 may obtain, from the inter mode branch for the particular reference picture list, an external picture flag that indicates whether the PU is predicted from an external picture. Moreover, in some examples, the external picture syntax element is a first external picture flag, the first external picture flag indicates whether a first reference block for the PU is derived from the external picture or a reference picture in the first reference picture list, and the syntax structure associated with the PU includes an inter mode branch for a second reference picture list. Furthermore, in such examples, video encoder 20 may generate, in the inter mode branch for the second reference picture list, a second external picture flag. The second external picture flag may indicate whether a second reference block for the PU is derived from an external picture or a reference picture in the second reference picture list. Video encoder 20 may generate, based at least in part on the first reference block and the second reference block, a predictive block for the PU. Similarly, video decoder 30 may obtain, from the inter mode branch for the second reference picture list, the second external picture flag. Video decoder 30 may generate, based at least in part on the first reference block and the second reference block, a predictive block for the PU.

In another alternative example, an external picture flag is the first syntax element within an intra mode branch of a prediction_unit syntax structure for a PU of a CU. In this example, when the external picture flag indicates that the CU is predicted from an external picture, video decoder 30 may treat the CU as an intra prediction mode CU, wherein intra prediction means there is only prediction from within the current access unit, though prediction from another picture that is in a different layer but the same access unit is possible. In this example, when the external picture flag indicates that the CU is predicted from an external picture, video encoder 20 does not generate, and video decoder 30 does not obtain, any additional syntax elements associated with intra prediction in the prediction_unit syntax structure. Example syntax elements associated with intra prediction may include a prev_intra_luma_pred_flag syntax element, an mpm_idx syntax element, and a rem_intra_luma_pred_mode syntax element that specify an intra prediction mode for luma samples associated with the PU. In addition, the syntax elements associated with intra prediction may include an intra_chroma_pred_mode syntax element that indicates an intra prediction mode for chroma samples associated with the PU.

Figure 5:
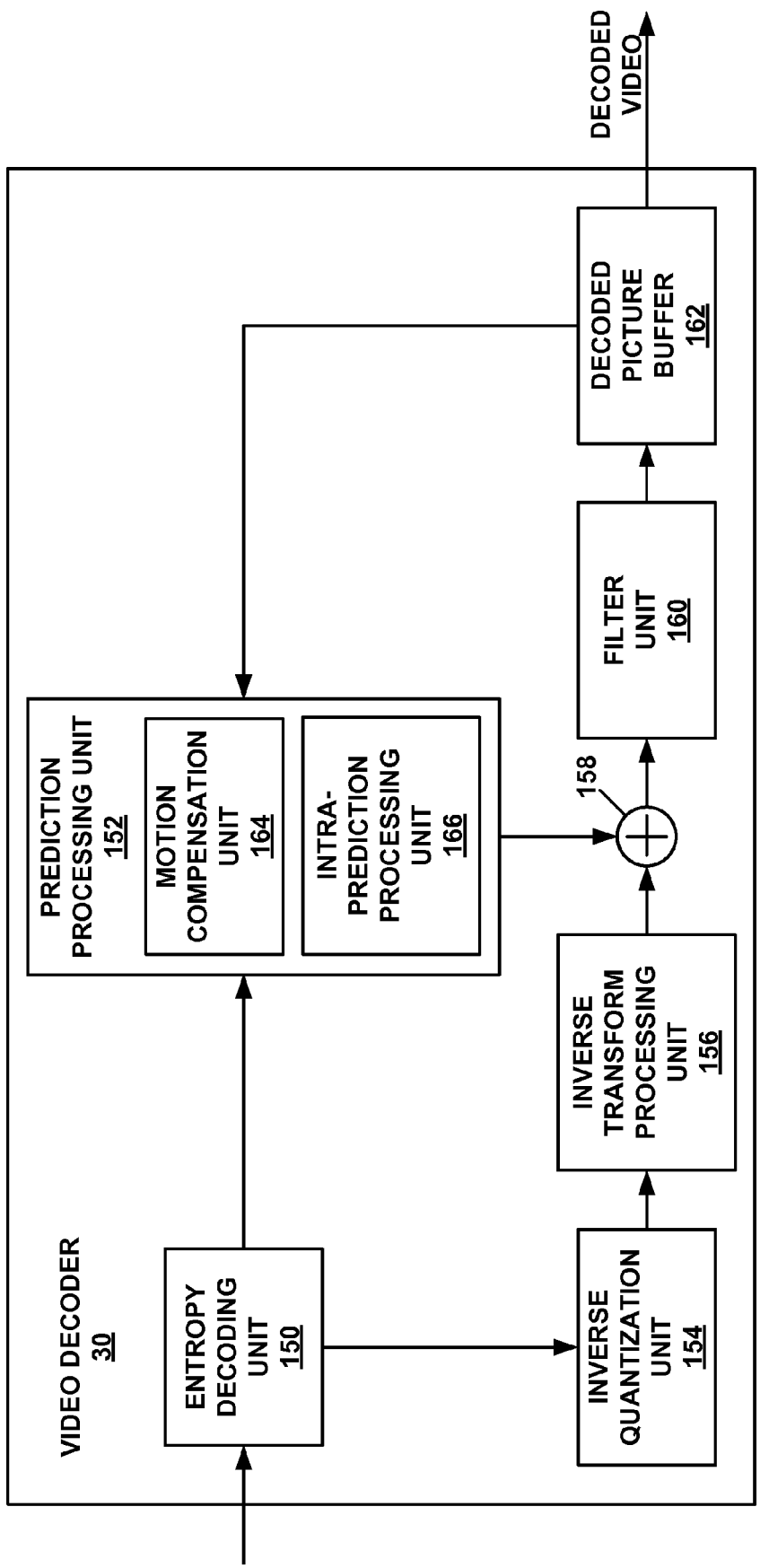
FIG. 5 is a block diagram illustrating an example video decoder that may implement the techniques described in this disclosure.

FIG. 5 is a block diagram illustrating an example video decoder 30 that is configured to implement the techniques of this disclosure. FIG. 5 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 5, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Entropy decoding unit 150 may receive NAL units and may parse the NAL units to obtain syntax elements from the bitstream. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements obtained from the bitstream. For instance, entropy decoding unit 150 may obtain, from the bitstream, an external picture flag that indicates whether a video unit (e.g., a CU or a PU) of a current picture is predicted from an external picture that is in a different layer than the current picture. The bitstream may or may not include a coded representation of the external picture.

The NAL units of the bitstream may include coded slice NAL units. As part of decoding the bitstream, entropy decoding unit 150 may obtain syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

Video decoder 30 may use the syntax elements decoded from the bitstream to perform reconstruct video units. For instance, video decoder 30 may use an external picture flag in a process to reconstruct video data (e.g., a sample block) for a video unit. To perform a reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 166 may perform intra prediction to generate predictive blocks for the PU. Intra-prediction processing unit 166 may use an intra prediction mode to generate the predictive luma, Cb and Cr blocks for the PU based on the prediction blocks of spatially-neighboring PUs. Intra-prediction processing unit 166 may determine the intra prediction mode for the PU based on one or more syntax elements obtained from the bitstream.

Prediction processing unit 152 may construct a first reference picture list (RefPicList0) and a second reference picture list (RefPicList1) based on syntax elements obtained from the bitstream. Furthermore, if a PU is encoded using inter prediction, entropy decoding unit 150 may decode motion information for the PU. Motion compensation unit 164 may determine, based on the motion information of the PU, one or more reference regions for the PU. Motion compensation unit 164 may generate, based on samples blocks at the one or more reference blocks for the PU, predictive luma, Cb and Cr blocks for the PU.

Reconstruction unit 158 may use the luma, Cb and Cr transform blocks associated with TUs of a CU and the predictive luma, Cb and Cr blocks of the PUs of the CU, i.e., either intra-prediction data or inter-prediction data, as applicable, to reconstruct the luma, Cb and Cr coding blocks of the CU. For example, reconstruction unit 158 may add samples of the luma, Cb and Cr transform blocks to corresponding samples of the predictive luma, Cb and Cr blocks to reconstruct the luma, Cb and Cr coding blocks of the CU.

Filter unit 160 may perform a deblocking operation to reduce blocking artifacts associated with the luma, Cb and Cr coding blocks of the CU. Video decoder 30 may store the luma, Cb and Cr coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the luma, Cb and Cr blocks in decoded picture buffer 162, intra prediction or inter prediction operations on PUs of other CUs.

Figure 6:
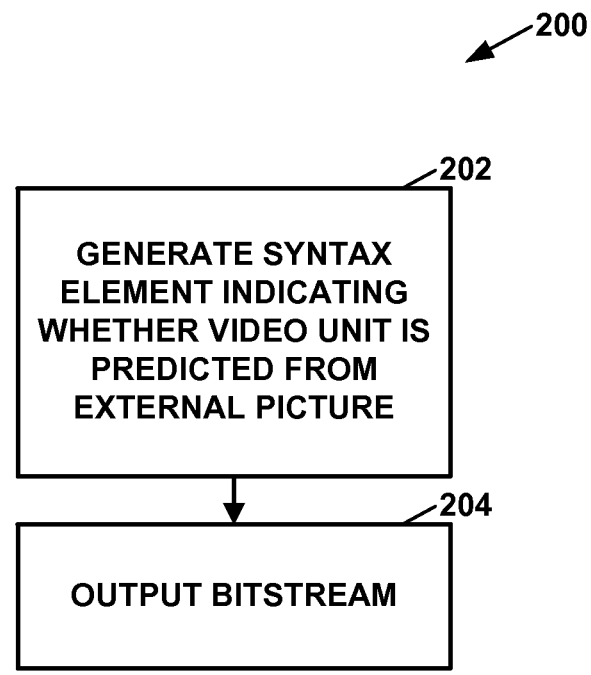
FIG. 6 is a flowchart illustrating an example operation of a video encoder, in accordance with one or more techniques of this disclosure.

FIG. 6 is a flowchart illustrating an example operation 200 of video encoder 20, in accordance with one or more techniques of this disclosure. In the example of FIG. 6, video encoder 20 may generate a syntax element that indicates whether a video unit of a current picture is predicted from an external picture that is in a different layer than the current picture (202). Furthermore, video encoder 20 may output a video data bitstream, the video data bitstream including a representation of the syntax element (204). The video data bitstream may or may not include a coded representation of the external picture.

Figure 7:
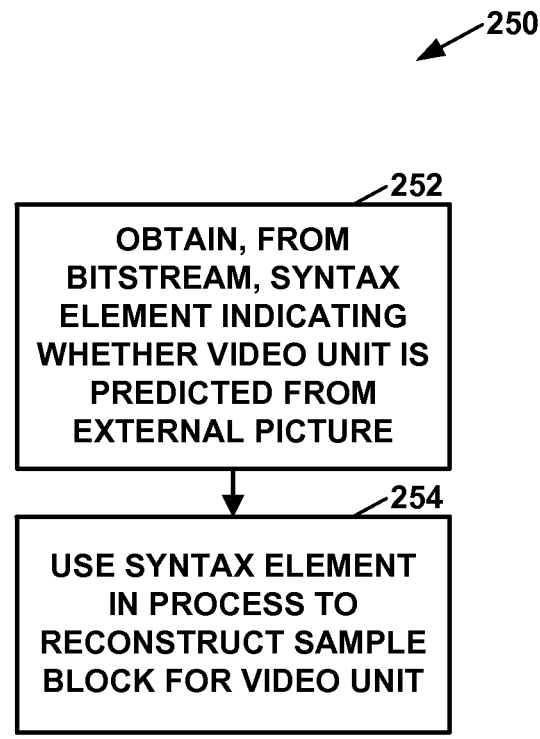
FIG. 7 is a flowchart illustrating an example operation of a video decoder, in accordance with one or more techniques of this disclosure.

FIG. 7 is a flowchart illustrating an example operation 250 of video decoder 250, in accordance with one or more techniques of this disclosure. In the example of FIG. 7, video decoder 30 may obtain, from a video data bitstream, a syntax element that indicates whether a video unit is predicted from an external picture that is in a different layer than the current picture (252). The video data bitstream may or may not include a coded representation of the external picture. In addition, video decoder 30 may use the syntax element in a process to reconstruct video data of at least a portion of the video unit (254). For example, as part of performing the process to reconstruct the video data of the portion of the video unit, video decoder 30 may determine whether the syntax element indicates that the video unit is predicted from an external picture. In this example, if video decoder 30 determines that the syntax element indicates that the video unit is predicted from the external picture, video decoder 30 may use a set of samples (e.g., a set of samples co-located with a sample block associated with the video unit) in the external picture to generate a predictive block for the video unit. Furthermore, in this example, video decoder 30 may generate, based at least in part on the predictive block for the video unit and a residual block for the video unit, the reconstructed sample block for the video unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   obtaining, from an inter mode branch of a prediction unit (PU) of a coding unit (CU) of a current picture included in a video data bitstream, a first syntax element, the inter mode branch being for a first reference picture list that does not include an external picture that is in a different layer than the current picture, the first syntax element indicating whether the PU is predicted from the external picture and indicating whether a first reference block for the PU is derived from the external picture or the first reference block for the PU is derived from a reference picture in the first reference picture list, and wherein:
   the external picture is generated by an external process,
   the current picture and the external picture have a same spatial resolution, and
   if the first syntax element indicates that the PU is predicted from the external picture, no syntax elements related to motion vector prediction and no information related to intra prediction are present in the PU;
   obtaining, from a slice header syntax structure for a slice included in the video data bitstream, a second syntax element, the second syntax element indicating whether the slice includes at least one CU that is predicted from the external picture or any other external picture;
   based on the second syntax element indicating that the slice includes at least one CU that is predicted from the external picture or any other external picture, obtaining, from the slice header syntax structure, a third syntax element, the third syntax element indicating a number of external pictures used to predict the at least one CU that is predicted from the external picture or any other external picture;
   using the first syntax element in a process to reconstruct video data of a portion of the PU, wherein using the first syntax element comprises, based on the first syntax element indicating that the PU is predicted from the external picture, copying a block of the external picture co-located with the PU as a predictor for the PU;
   determining that a syntax structure associated with the PU includes an inter mode branch for a second reference picture list that does not include the external picture;
   obtaining, from the inter mode branch for the second reference picture list, a fourth syntax element, the fourth syntax element indicating whether a second reference block for the PU is derived from the external picture or the second reference block for the PU is derived from a reference picture in the second reference picture list; and
   generating, based at least in part on the first reference block and the second reference block, a predictive block for the PU.

2. The method of claim 1, wherein the video data bitstream does not include a coded representation of the external picture.

3. The method of claim 1, further comprising:
   obtaining, from a parameter set, a fifth syntax element, the fifth syntax element indicating whether any CU of any slices referring to the parameter set is predicted from the external picture or any other external picture,
   wherein the parameter set is one of a video parameter set, a sequence parameter set, a picture parameter set, or an adaptation parameter set.

4. The method of claim 1, further comprising:
   obtaining, from a parameter set, a fifth syntax element, the fifth syntax element indicating a maximum number of external pictures that are usable with respect to slices referring to the parameter set,
   wherein the parameter set is one of a video parameter set, a sequence parameter set, a picture parameter set, or an adaptation parameter set.

5. The method of claim 1, wherein the video data bitstream comprises a base layer that conforms to a video coding standard that specifies a decoding process for video units predicted from external pictures.

6. The method of claim 1, wherein the external picture is a view synthesis prediction (VSP) picture.

7. A video decoding device comprising:
   a memory configured to store at least a portion of a video data bitstream; and
   one or more processors coupled to the memory, the one or more processors being configured to:
   obtain, from an inter mode branch of a prediction unit (PU) of a coding unit (CU) of a current picture included in the video data bitstream, a first syntax element, the inter mode branch being for a first reference picture list that does not include an external picture that is in a different layer than the current picture, the first syntax element indicating whether the PU is predicted from the external picture and indicating whether a first reference block for the PU is derived from the external picture or the first reference block for the PU is derived from a reference picture in the first reference picture list, and wherein:
   the external picture is generated by an external process,
   the current picture and the external picture have a same spatial resolution, and
   if the first syntax element indicates that the PU is predicted from the external picture, no syntax elements related to motion vector prediction and no information related to intra prediction are present in the PU;

obtain, from a slice header syntax structure for a slice included in the video data bitstream, a second syntax element, the second syntax element indicating whether the slice includes at least one CU that is predicted from the external picture or any other external picture;

based on the second syntax element indicating that the slice includes at least one CU that is predicted from the external picture or any other external picture, obtain, from the slice header syntax structure, a third syntax element that indicates a number of external pictures used to predict the at least one CU that is predicted from the external picture or any other external picture;

use the first syntax element in a process to reconstruct video data of a portion of the PU, wherein, to use the first syntax element, the one or more processors are configured to copy, based on the first syntax element indicating that the PU is predicted from the external picture, a block of the external picture co-located with the PU as a predictor for the PU;

determining that a syntax structure associated with the PU includes an inter mode branch for a second reference picture list that does not include the external picture;

obtain, from the inter mode branch for the second reference picture list, a fourth syntax element, the fourth syntax element indicating whether a second reference block for the PU is derived from the external picture or the second reference block for the PU is derived from a reference picture in the second reference picture list; and generate, based at least in part on the first reference block and the second reference block, a predictive block for the PU.

8. The video decoding device of claim 7, wherein the video data bitstream does not include a coded representation of the external picture.

9. The video decoding device of claim 7, wherein:
the one or more processors are further configured to obtain, from a syntax structure associated with the CU, a fifth syntax element, the fifth syntax element indicating whether the CU is predicted from the external picture.

10. The video decoding device of claim 9, wherein the one or more processors are configured such that:
in response to determining that the fifth syntax element indicates that the CU is not predicted from the external picture, the one or more processors obtain, from the syntax structure associated with the CU, a syntax structure associated with the PU of the CU; and
in response to determining that the fifth syntax element indicates that the CU is predicted from the external picture, the one or more processors refrain from obtaining, from the syntax structure associated with the CU, a syntax structure for any PU of the CU.

11. The video decoding device of claim 9, wherein the one or more processors are configured such that, in response to determining that the fifth syntax element indicates that the CU is predicted from the external picture, the one or more processors obtain, from the syntax structure associated with the CU, a residual data syntax element that indicates whether residual data are present in the syntax structure associated with the CU.

12. The video decoding device of claim 9, wherein the one or more processors are configured to obtain, from the syntax structure associated with the CU, an index syntax element that specifies an index to the external picture in a list of external pictures.

13. The video decoding device of claim 7, wherein the first syntax element always indicates that the PU is not predicted from the external picture when the video data bitstream only includes a base layer.

14. The video decoding device of claim 7, wherein the video data bitstream comprises a base layer that conforms to a video coding standard that specifies a decoding process for PUs predicted from external pictures.

15. The video decoding device of claim 7, wherein the video data bitstream comprises a base layer and one or more additional layers, wherein the base layer conforms to a first video coding standard and the additional layers conform to a second, different video coding standard.

16. The video decoding device of claim 15, wherein the one or more additional layers comprise one or more enhancement layers or comprise one or more views.

17. The video decoding device of claim 7, wherein the external picture is a view synthesis prediction (VSP) picture.

18. A video decoding device comprising:
means for obtaining, from an inter mode branch of a prediction unit (PU) of a coding unit (CU) of a current picture included in a video data bitstream, a first syntax element, the inter mode branch being for a first reference picture list that does not include an external picture that is in a different layer than the current picture, the first syntax element indicating whether the PU is predicted from the external picture and indicating whether a first reference block for the PU is derived from the external picture or the first reference block for the PU is derived from a reference picture in the first reference picture list, wherein the PU is associated with the current picture, and wherein:
the external picture is generated by an external process,
the current picture and the external picture have a same spatial resolution, and
if the first syntax element indicates that the PU is predicted from the external picture, no syntax elements related to motion vector prediction and no information related to intra prediction are present in the PU;

means for obtaining, from a slice header syntax structure for a slice included in the video data bitstream, a second syntax element, the second syntax element indicating whether the slice includes at least one CU that is predicted from the external picture or any other external picture;

means for obtaining, based on the second syntax element indicating that the slice includes at least one CU that is predicted from the external picture or any other external picture, from the slice header syntax structure, a third syntax element indicating a number of external pictures used to predict the at least one CU that is predicted from the external picture or any other external picture;

means for using the first syntax element in a process to reconstruct video data of a portion of the PU, wherein the means for using the first syntax element comprise means for copying, based on the first syntax element indicating that the PU is predicted from the external picture, a block of the external picture co-located with the PU as a predictor for the PU;

means for determining that a syntax structure associated with the PU includes an inter mode branch for a second reference picture list that does not include the external picture;

means for obtaining, from the inter mode branch for the second reference picture list, a fourth syntax element, the fourth syntax element indicating whether a second reference block for the PU is derived from the external picture or the second reference block for the PU is derived from a reference picture in the second reference picture list; and means for generating, based at least in part on the first reference block and the second reference block, a predictive block for the PU.

19. A non-transitory computer-readable data storage medium encoded with instructions that, when executed, cause one or more processors of a video decoding device to:

obtain, from an inter mode branch of a prediction unit (PU) of a coding unit (CU) of a current picture included in a video data bitstream, a first syntax element, the inter mode branch being for a first reference picture list that does not include an external picture that is in a different layer than the current picture, the first syntax element indicating whether the PU is predicted from the external picture and indicating whether a first reference block for the PU is derived from the external picture or the first reference block for the PU is derived from a reference picture in the first reference picture list, and wherein:

the external picture is generated by an external process, the current picture and the external picture have a same spatial resolution, and if the first syntax element indicates that the PU is predicted from the external picture, no syntax elements related to motion vector prediction and no information related to intra prediction are present in the PU;

obtain, from a slice header syntax structure for a slice included in the video data bitstream, a second syntax element, the second syntax element indicating whether the slice includes at least one CU that is predicted from the external picture or any other external picture;

based on the second syntax element indicating that the slice includes at least one CU that is predicted from the external picture or any other external picture, obtain, from the slice header syntax structure, a third syntax element indicating a number of external pictures used to predict the at least one CU that is predicted from the external picture or any other external picture;

use the first syntax element in a process to reconstruct video data of a portion of the PU, wherein the instructions to use the first syntax element comprise instructions to copy, based on the first syntax element indicating that the PU is predicted from the external picture, a block of the external picture co-located with the PU as a predictor for the PU;

determine that a syntax structure associated with the PU includes an inter mode branch for a second reference picture list that does not include the external picture;

obtain, from the inter mode branch for the second reference picture list, a fourth syntax element, the fourth syntax element indicating whether a second reference block for the PU is derived from the external picture or the second reference block for the PU is derived from a reference picture in the second reference picture list; and generate, based at least in part on the first reference block and the second reference block, a predictive block for the PU.

20. The method of claim 1, the method being executable on a wireless communication device, wherein the device comprises:
a memory configured to store the video data;
a processor configured to execute instructions to process the video data stored in the memory; and
a receiver configured to receive the first syntax element.

21. The method of claim 20, wherein the wireless communication device is a cellular telephone and the first syntax element is received by the receiver and modulated according to a cellular communication standard.

22. The video decoding device of claim 7, wherein the video decoding device is a wireless communication device, the video decoding device further comprising a receiver configured to receive the first syntax element.

23. The video decoding device of claim 22, wherein the wireless communication device is a cellular telephone and the first syntax element is received by the receiver and modulated according to a wireless communication standard.

24. The video decoding device of claim 7, further comprising a display device configured to display at least a portion of the video data.

25. The video decoding device of claim 7, further comprising at least one of:
one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

26. The video decoding device of claim 18, further comprising means for displaying at least a portion of the video data.

27. The video decoding device of claim 18, further comprising at least one of:
one or more integrated circuits;
one or more microprocessors;
one or more digital signal processors (DSPs);
one or more field programmable gate arrays (FPGAs);
a desktop computer;
a laptop computer;
a tablet computer;
a phone;
a television;
a camera;
a display device;
a digital media player;
a video game console;
a video game device;
a video streaming device; or
a wireless communication device.

* * * * *